United States Patent
Funakawa

(10) Patent No.: US 10,270,925 B2
(45) Date of Patent: Apr. 23, 2019

(54) TOUCH PANEL INPUTTING DEVICE

(71) Applicant: KONICA MINOLTA, INC., Chiyoda-ku (JP)

(72) Inventor: Hisataka Funakawa, Okazaki (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 80 days.

(21) Appl. No.: 14/480,674

(22) Filed: Sep. 9, 2014

(65) Prior Publication Data
US 2015/0070326 A1 Mar. 12, 2015

(30) Foreign Application Priority Data
Sep. 11, 2013 (JP) .................... 2013-188447

(51) Int. Cl.
*G06F 3/042* (2006.01)
*H04N 1/00* (2006.01)
*G06F 3/041* (2006.01)

(52) U.S. Cl.
CPC ....... *H04N 1/00411* (2013.01); *G06F 3/0416* (2013.01); *G06F 3/0421* (2013.01); *H04N 1/00392* (2013.01); *H04N 2201/0094* (2013.01)

(58) Field of Classification Search
CPC ......... G09G 5/00; G06F 3/041; G06F 3/0416; G06F 3/042; G06F 3/0421; G06F 3/0423; G06F 3/0428
See application file for complete search history.

(56) References Cited

U.S. PATENT DOCUMENTS 5,525,764 A * 6/1996 Junkins ................. G06F 3/0423
    178/18.01
2003/0218761 A1* 11/2003 Tomasi ................. G06F 1/1626
    356/627

(Continued)

FOREIGN PATENT DOCUMENTS

CN    102214045 A    10/2011
CN    102236476 A    11/2011

(Continued)

OTHER PUBLICATIONS

Office Action issued by the State Intellectual Property Office of People's Republic of China dated Dec. 5, 2016, in counterpart Chinese Patent Application No. 201410460807.3, and an English translation of the Office Action (43 pages).

(Continued)

*Primary Examiner* — Chanh D Nguyen
*Assistant Examiner* — Nguyen H Truong
(74) *Attorney, Agent, or Firm* — Buchanan Ingersoll & Rooney PC

(57) ABSTRACT

The touch panel inputting device which is installed on a flat operation surface for receiving an operation performed by a operation body, detects a contact location of the operation body on the operation surface, based on light blocking of a flat scanning light path plane. The touch panel inputting device comprises: a first scanning light paths forming unit for forming first scanning light paths which are linear; and a second scanning light paths forming unit for forming second scanning light paths which are linear and intersect with the first scanning light paths. The first and the second scanning light paths form the scanning light path plane, and the scanning light path plane slopes with respect to the operation surface.

13 Claims, 30 Drawing Sheets

(56) References Cited

U.S. PATENT DOCUMENTS

| | | | |
|---|---|---|---|
| 2006/0139337 A1* | 6/2006 | Fukao | G03G 15/5016 345/173 |
| 2007/0222760 A1* | 9/2007 | Lieberman | G06F 3/0426 345/168 |
| 2009/0189878 A1 | 7/2009 | Goertz et al. | |
| 2010/0110027 A1* | 5/2010 | Lipman | G06F 3/0416 345/173 |
| 2010/0234094 A1* | 9/2010 | Gagner | G07F 17/32 463/20 |
| 2011/0199336 A1* | 8/2011 | Kao | G06F 1/3262 345/175 |
| 2012/0249418 A1* | 10/2012 | Onishi | G06F 3/0421 345/156 |
| 2013/0050120 A1* | 2/2013 | Takahashi | G06F 3/017 345/173 |
| 2013/0088451 A1* | 4/2013 | Payne | B41J 3/46 345/173 |
| 2013/0156376 A1* | 6/2013 | Charters | G02B 6/4298 385/36 |
| 2013/0187891 A1* | 7/2013 | Eriksson | G06F 3/0421 345/175 |
| 2013/0257809 A1* | 10/2013 | Wei | G06F 3/0428 345/175 |
| 2014/0149754 A1* | 5/2014 | Silva | G06F 1/3212 713/300 |
| 2015/0205439 A1 | 7/2015 | Xu et al. | |

FOREIGN PATENT DOCUMENTS

| | | |
|---|---|---|
| CN | 102317893 A | 1/2012 |
| CN | 103019461 A | 4/2013 |
| CN | 103235670 A | 8/2013 |
| JP | 5-241733 A | 9/1993 |
| JP | 2009-199259 A | 9/2009 |
| JP | 2010-181916 A | 8/2010 |

OTHER PUBLICATIONS

The Second Office Action dated Aug. 25, 2017 by the State Intellectual Property Office of People's Republic of China in corresponding Chinese Patent Application No. 201410460807.3 and an English Translation of the Office Action. (28 pages).

* cited by examiner

TOUCH PANEL INPUTTING DEVICE

This application is based on Japanese Patent Application No. 2013-188447 filed with the Japan Patent Office on Sep. 11, 2013, the entire content of which is hereby incorporated by reference.

BACKGROUND OF THE INVENTION

Field of the Invention

This invention relates to a touch panel inputting device. More specifically, this invention relates to a touch panel inputting device which detects the contact of an operation body on an operation surface, based on light blocking in a scanning light path plane.

Description of the Related Art

A generic image forming apparatus, for example MFP (Multifunction Peripheral), is equipped with an operation panel. The operation panel has a display panel which displays an operation screen including software keys, and a touch panel inputting device placed on the display panel. The image forming apparatus detects touches on software keys etc. displayed on the display panel, by using the touch panel inputting device. The image forming apparatus executes a process assigned to the touched key etc. at the location where the touch is detected. Herewith, the user can perform an operation such as a setting for devices, by touching the operation screen displayed on the display panel. The user can perform instinctive operations and enjoy good operability.

Touch panel inputting devices can detect touches by various methods, for example an optical type method, a resistive type method, a capacitance type method, or the like. Here, a touch panel inputting device which adopts an optical type method will be explained.

FIG. 27 schematically shows a structure of a conventional optical touch panel inputting device. FIG. 28 schematically shows a scanning light path plane of the conventional optical touch panel inputting device.

Referring to FIGS. 27 and 28, the conventional touch panel inputting device comprises a pair of light emitting elements array 1101 and light reception elements array 1102 which are placed at both end portions of the X-axis on operation surface CP of display panel 1100, facing each other. Further, a pair of a light emitting elements array and a light reception elements array facing each other is placed at both end portions of the Y-axis on operation surface CP of display panel 1100. The light emitting elements array is configured with a plurality of LEDs (Light Emitting Diodes). The light reception elements array is configured with a plurality of PDs (Photodiodes).

The optical touch panel inputting device receives light emitted from each of LEDs at each of PDs to scan operation surface CP. The optical touch panel inputting device determines the touched position, based on the location of the PD at which the light receiving amount is reduced. According to the conventional optical touch panel inputting device, the installation heights of all LEDs and PDs is same (distances between operation surface CP and each of LEDs and PDs is same). Hence, scanning light path plane SL101 is configured parallel with operation surface CP. Scanning light path plane SL101 is close to operation surface CP.

According to an optical touch panel inputting device, it is structurally easy to manufacture a big panel. Further, an optical touch panel inputting device is heavy-duty, since users do not touch the sensors directly. On the other hand, an optical touch panel inputting device has a problem of tendency to misdetect foreign material adhered to the operation surface as touch input.

To prevent the misdetection of foreign material adhered to the operation surface as touch input, a conventional optical touch panel inputting device performs the following behavior. The optical touch panel inputting device detects light blocking when the light receiving amount of the PD is reduced. The optical touch panel inputting device calculates the size of the area where light is blocked (a light blocking area), based on the locations of the PDs at which the light receiving amount is reduced. The optical touch panel inputting device recognizes the light blocking as a touch, when the calculated light blocking area is more than a threshold value of a light blocking area. The optical touch panel inputting device does not recognize the light blocking as a touch, when the calculated light blocking area is less than the threshold value of a light blocking area. In this case, the optical touch panel inputting device recognizes that light was blocked by foreign material.

The technique of a conventional optical touch panel inputting device is disclosed in Document 1 (Japan Patent Publication No. 2010-181916). The optical touch panel inputting device of Document 1 comprises an operation unit, a calculation unit for detecting adhesives of particles, dust, or the like on the operation surface based on the detection result of the operation unit, and an operation surface movement for moving the operation surface in Z-axis direction, perpendicular to the operation surface. The operation unit is for detecting X and Y coordinates of the point on the operation surface by detecting light blocking in matrix optical axes formed by pairs of light emitting elements and light reception elements. The calculation unit determines that there is an adhesive on the operation screen, in case that the area of light blocking is less than a prescribed threshold value. The calculation unit eliminates the effect of the adhesive, by moving the operation surface in Z-axis direction using the operation surface movement.

According to the conventional optical touch panel inputting device, a touch performed by a fingertip of a user may not be detected. Then, the conventional optical touch panel inputting device has a problem that responsiveness of operations is not good.

FIG. 29 shows the relationship among an operation state of a finger, a contact area of the finger and contact determination, in accordance with a conventional optical touch panel inputting device.

Referring to FIG. 29, when a user touches operation surface CP by the ball of a finger, as shown in (a), the light of a lot of scanning light paths in scanning light path plane SL101 is blocked by the finger. Then, the light receiving amount is reduced at a lot of the PDs, and the calculated light blocking area is large. In consequence, since the light blocking area is more than threshold value T2 of a light blocking area, a touch is detected. On the other hand, when a user touches operation surface CP by the fingertip, as shown in (b), the light of a few scanning light paths in scanning light path plane SL 101 is blocked by the finger. Then, the light receiving amount is reduced at only a few PDs, and the calculated light blocking area is small. In consequence, since the light blocking area is less than threshold value T2 of a light blocking area, a touch is not detected.

To increase the light blocking area calculated when a user touches operation surface CP by a fingertip; one idea is that scanning light path plane SL 101 is placed at the location away from operation surface CP. However, in accordance this idea, a touch may be detected before the finger reaches operation surface CP. Further, an amount of displacement resulted from parallax between the detected position and the touched position may be large, in case that the user looks at operation surface CP at an angle.

In case that the operation surface slopes and a user touches a front side of the operation surface, the user tends to use a fingertip.

FIG. 30 schematically shows the relationship between a point of the operation and the contact area, in case that operation surface CP is fixed at constant height and a constant angle.

Referring to FIG. 30, an operation surface of a MFP etc. is fixed to the main body of the apparatus unlike a portable terminal device, so that the surface slopes with respect to the horizontal plane. When operating such the operation panel, a user performs touching on the operation surface, not moving the wrist as a supporting point broadly but changing only the direction of the finger. More specifically, as shown in FIG. 30(a), a user tends to use the ball of a finger when touching an upper part of operation surface CP. As shown in FIG. 30(b), a user tends to use the fingertip when touching a lower part of operation surface CP. Hence, in case that the touching point is lower on operation surface CP, the light blocking area is smaller and a margin with respect to a threshold value of a light blocking area is narrower. In consequence, a touch may be less detectable depending on the touch location, although the user touches the operation surface at constant strength. Hence, responsiveness of operations worsens.

The object of this invention is to provide a touch panel inputting device having good responsiveness of operations.

SUMMARY OF THE INVENTION

According to an embodiment of this invention, a touch panel inputting device which is installed on a flat operation surface for receiving an operation performed by a operation body, and detects a contact location of the operation body on the operation surface, based on light blocking of a flat scanning light path plane, comprises: a first scanning light paths forming unit for forming first scanning light paths which are linear; and a second scanning light paths forming unit for forming second scanning light paths which are linear and intersect with the first scanning light paths; wherein the first and the second scanning light paths form the scanning light path plane, and the scanning light path plane slopes at a prescribed angle with respect to the operation surface from the one end to the other end of the operation surface.

According to another embodiment of this invention, a touch panel inputting device which is installed on a flat operation surface for receiving an operation performed by a operation body, and detects a contact location of the operation body on the operation surface, based on light blocking of a flat scanning light path plane, comprises: a first scanning light paths forming unit for forming first scanning light paths which are linear; a second scanning light paths forming unit for forming second scanning light paths which are linear and intersect with the first scanning light paths; a third scanning light paths forming unit for forming third scanning light paths which are linear; and a fourth scanning light paths forming unit for forming fourth scanning light paths which are linear and intersect with the third scanning light paths; wherein the first and the second scanning light paths form a lower scanning light path plane, wherein the distance between the lower scanning light path plane and the operation surface is relatively short; the third and the fourth scanning light paths form a upper scanning light path plane, wherein the distance between the upper scanning light path plane and the operation surface is relatively long.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiment of this invention will be explained below with the Figures.

In the following embodiments, the case in which a touch panel inputting device is an operation panel device installed on an image forming apparatus will be explained. The image forming apparatus may be a MFP, a facsimile device, a copying machine, a printer, or the like. The touch panel inputting device is placed on an operation surface as a plane which receives operations performed by operation bodies. The touch panel inputting device is for detecting the contact of the operation bodies on the operation surface as a plane, based on light blocking on a scanning light path plane. The touch panel inputting device can be installed on a tablet, a PC (Personal Computer), a cellular phone, a ticket vending machine, or the like, other than an image forming apparatus.

In this Description, "a scanning light path" means a path on which light travels from a light emitting element to a light reception element for detecting an operation body. "A scanning light path plane" means a plane consists of a plurality of scanning light paths for detecting an operation body. "The distance between a scanning light path plane and an operation surface" means the distance between an arbitrary point on an operation surface and a point on a scanning light path plane, the point on a scanning light path plane is on a straight line which starts at the arbitrary point on the operation surface toward the scanning light path plane, the line is in parallel with a normal direction of the operation surface.

[The First Embodiment]

Firstly, a structure of an image forming apparatus equipped with a touch panel inputting device of the embodiment will be explained.

Figure 1:
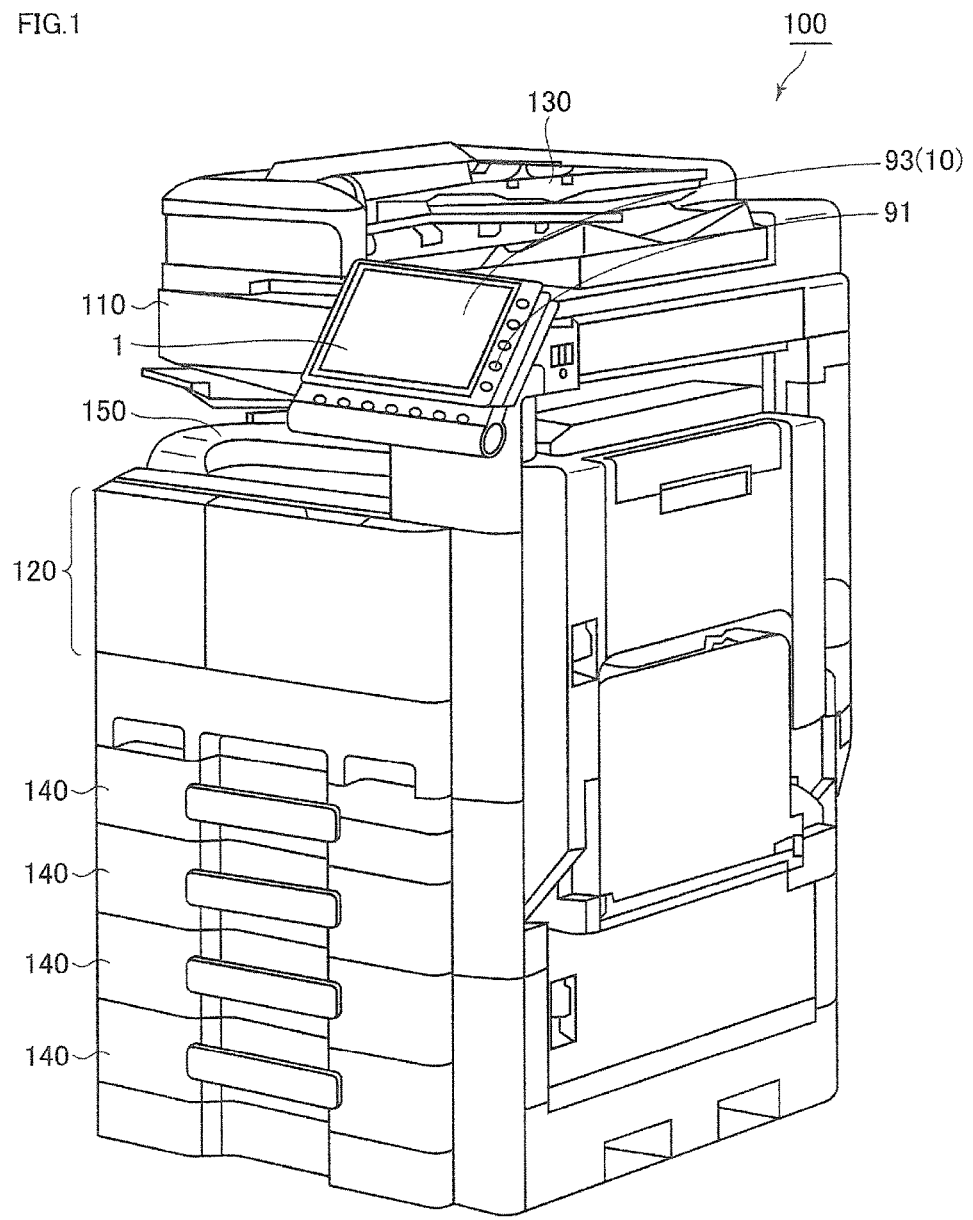
FIG. 1 shows a perspective view of an overall structure of an image forming apparatus of the first embodiment of this invention.

Referring to FIG. 1, image forming apparatus 100 is a MFP having a scanner function, a facsimile function, a copying function, a network function, a BOX function, a function as a printer, or the like. Image forming apparatus 100 mainly comprises scanner unit 110 which reads documents optically and acquires image data, and print engine 120 which prints images on sheets based on the image data. At the top of a main body of image forming apparatus 100, feeder 130 for conveying documents to scanner unit 110 is installed. At the bottom of image forming apparatus 100, a plurality of paper feeding units 140 for providing sheets to print engine 120 are installed. At the center of image forming apparatus 100, tray 150 for the ejected sheets on which images are formed by print engine 120 is installed.

Image forming apparatus 100 is further equipped with operation panel device 1 as a touch panel inputting device of the embodiment. Operation panel device 1 is installed at a front side (a user's side) of an upper portion of the main body of image forming apparatus 100. Operation panel device 1 is for operating image forming apparatus 100. Operation panel device 1 has a plurality of hardware keys 91, a display panel (a displaying device) 93 and touch panel 10. Hardware keys 91 is for receiving input operations of various kinds of instructions from a user, numerals, characters, symbols, or the like. Display panel 93 displays various information to users. For example, display panel 93 displays an operation screen receiving various operations relating to image forming apparatus 100. Touch panel 10 detects operations (for example, operations of touching the operation screen) to a menu screen performed by operation bodies such as fingers. Display panel 93 has operation surface CP (See FIG. 2) which is a plane receiving operations performed by operation bodies.

An operation surface of operation panel device 1 is installed to slope with respect to the horizontal plane, so that a user easily operates the device, standing in front of image forming apparatus 100. Image forming apparatus 100 may have a structure which can change the angle of the operation surface for wheelchair users etc.

Next, the structure of operation panel device 1 of this embodiment will be explained.

Figure 2:
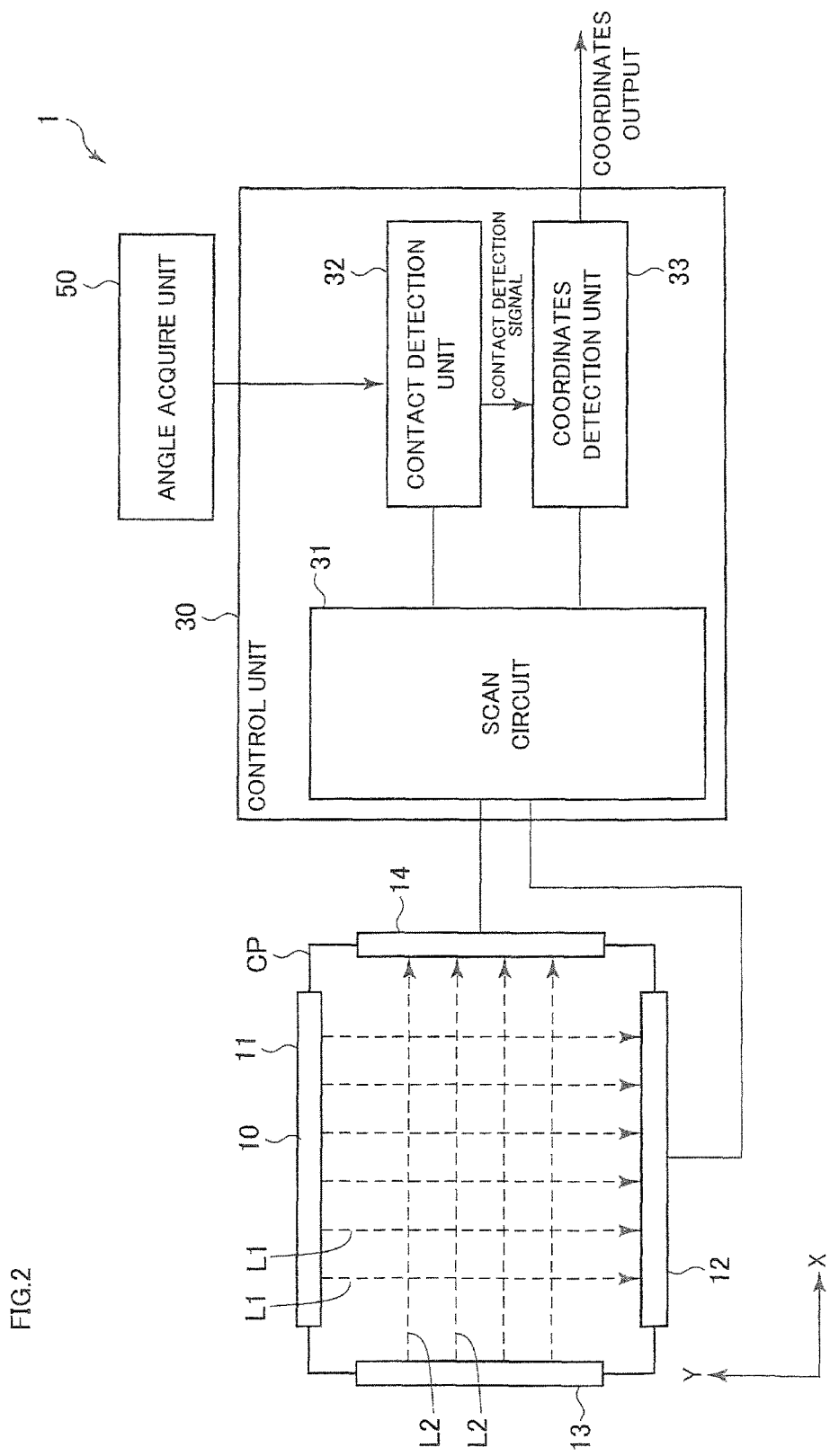
FIG. 2 shows a block diagram of the structure of an operation panel device 1 of the first embodiment of this invention.

FIG. 2 shows a block diagram of the structure of an operation panel device 1 of the first embodiment of this invention. In this Figure, X axis and Y axis are at right angles to each other. In FIGS. 2, 4, 7, 10, 24 and 25, it is supposed that a user who operates operation panel device 1 is standing at the bottom part of the Figures. In the following Figures, the side of operation surface CP close to the user may be referred as "the front side", while the side of operation surface CP at a distance from the user may be referred as "the back side".

Referring to FIG. 2, operation panel device 1 of this embodiment includes touch panel 10, control unit 30, and angle acquire unit 50.

Touch panel 10 is installed on operation surface CP. Touch panel 10 includes light emitting elements array 11, light reception elements array 12, light emitting elements array 13, and light reception elements array 14. Light emitting elements array 11 is configured with a plurality of light emitting elements arranged in a linear fashion in the X-axis direction. Light reception elements array 12 is configured with a plurality of light reception elements in a linear fashion in the X-axis direction. Light emitting elements array 13 is configured with a plurality of light emitting elements arranged in a linear fashion in the Y-axis direction. Light reception elements array 14 is configured with a plurality of light reception elements arranged in a linear fashion in the Y-axis direction.

Light emitting elements array 11 and light reception elements array 12 face each other, and form a plurality of scanning light paths L1. Light emitting elements array 11 is placed at the back side end of operation surface CP. Light reception elements array 12 is placed at a front side end of operation surface CP. Each of a plurality of scanning light paths L1 is the path on which light emitted by each of a plurality of light emitting elements of light emitting elements array 11 travels before it is received by each of a plurality of light reception elements of light reception elements array 12. Each of a plurality of scanning light paths L1 is in the Y-axis direction.

Light emitting elements array 13 and light reception elements array 14 face each other, and form a plurality of scanning light paths L2. Light emitting elements array 13 is placed at a left end of operation surface CP. Light reception elements array 14 is placed at a right end of operation surface CP. Each of a plurality of scanning light paths L2 is the path on which light emitted by each of a plurality of light emitting elements of light emitting elements array 13 travels before it is received by each of a plurality of light reception elements of light reception elements array 14. Each of a plurality of scanning light paths L2 is in the X-axis direction. A light emitting element is formed by a LED, for example. A light reception element is formed by a PD, for example.

Control unit 30 acquires the position of the operation detected by touch panel 10. Control unit 30 acquires input information based on the acquired position. Control unit 30 is configured with a CPU (Central Processing Unit), a ROM (Read Only Memory), a RAM (Random Access Memory), or the like. Control unit 30 includes scan circuit 31, contact detection unit 32, and coordinates detection unit 33.

Scan circuit 31 is connected with all of light emitting elements form light emitting elements arrays 11 and 13, and all of light reception elements form light reception elements arrays 12 and 14. Scan circuit 31 scans light emitting elements and light reception elements in series. Scan circuit 31 transmits input (the light receiving amount) from each of light reception elements corresponding to each of light emitting elements to contact detection unit 32 and coordinates detection unit 33. Contact detection unit 32 determines whether an operation body contacts with operation surface CP or not, based on input from each of light reception elements received from scan circuit 31. In case that contact detection unit 32 determined that an operation body contacts with operation surface CP, contact detection unit 32 transmits a contact detection signal to coordinates detection unit 33. Coordinates detection unit 33 identifies the location where scanning light paths are interrupted (where light is blocked) by the operation body based on input of each of light reception elements received from scan circuit 31, triggered by the contact detection signal input from contact detection unit 32. Coordinates detection unit 33 transmits coordinates of the location where the operation body contacts with operation surface CP, to the control unit of image forming apparatus 100.

Angle acquire unit 50 acquires the inclination angle of the operation surface of operation panel device 1 with respect to the horizontal plane, and transmits it to contact detection unit 32. Angle acquire unit 50 is attached to a hinge member of operation panel device 1 etc.

Figure 3:
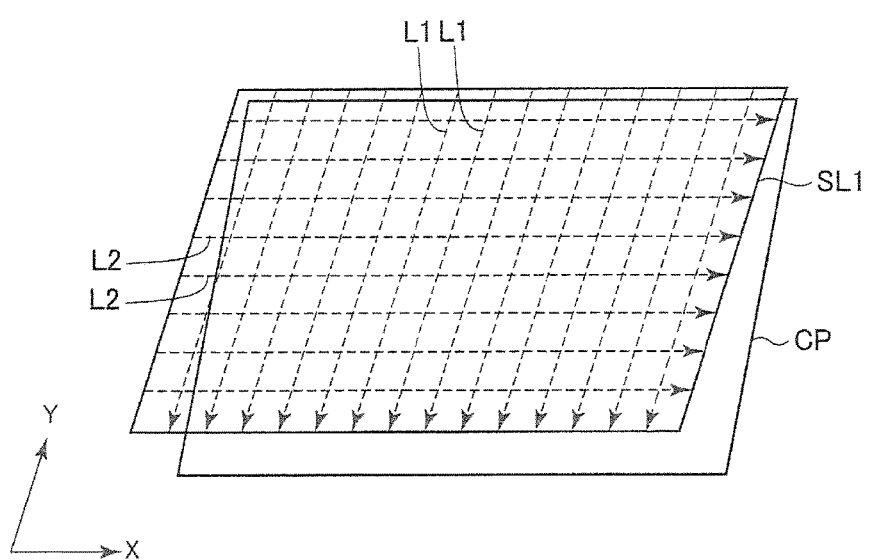
FIG. 3 schematically shows the relationship between scanning light path plane SL1 and operation surface CP, the scanning light path plane SL 1 is configured with scanning light paths L1 and L2.

FIG. 3 schematically shows the relationship between scanning light path plane SL1 and operation surface CP, the scanning light path plane SL1 is configured with scanning light paths L1 and L2.

Referring to FIG. 3, a plurality of scanning light paths L1 and L2l configure a scanning light path plane (a scanning plane) SL1 which is a flat surface. Scanning light path plane SL 1 slopes with respect to operation surface CP. The direction of tilt and the inclination angle of scanning light path plane SL1 are arbitrary. Scanning light path plane SL1 at a front side end of operation surface CP is higher than scanning light path plane SL1 at the back side end of operation surface CP (Scanning light path plane SL1 at a front side end is distant from operation surface CP, rather than scanning light path plane SL1 at the back side end). Operation panel device 1 detects that an operation body contacts operation surface CP, based on a light blocking on scanning light path plane SL1.

Next, the contact detection method and the contact point detection method of the operation body by operation panel device 1 will be explained in detail.

Figure 4:
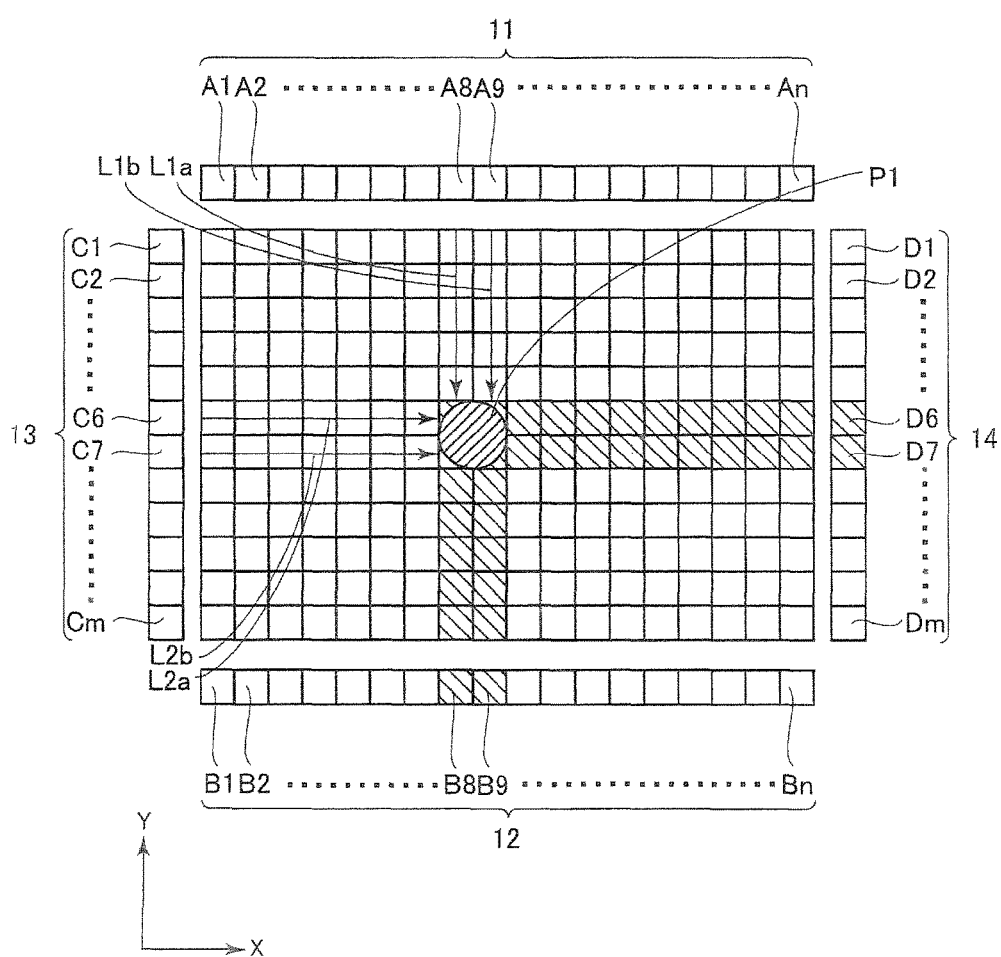
FIG. 4 schematically shows a plain view of a structure of touch panel 10 of the first embodiment of this invention.
Figure 5:
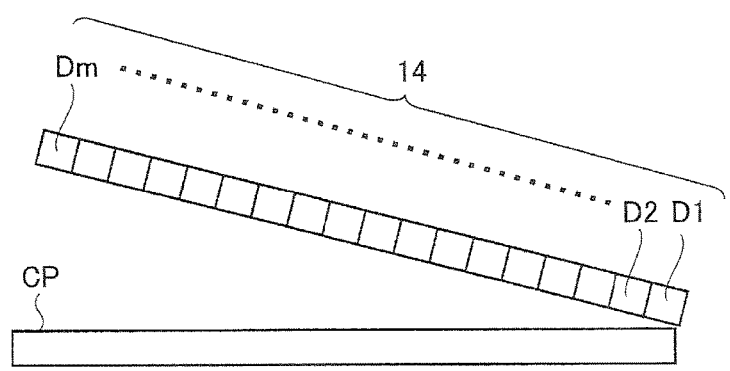
FIG. 5 schematically shows a right side view of a structure of touch panel 10 of the first embodiment of this invention.

FIG. 4 schematically shows a plain view of a structure of touch panel 10 of the first embodiment of this invention. FIG. 5 schematically shows a right side view of a structure of touch panel 10 of the first embodiment of this invention.

Referring to FIGS. 4 and 5, light emitting elements array 11 is configured with light emitting elements A 1 to An. Light reception elements array 12 is configured with light reception elements B1 to Bn. Light emitting elements array 13 is configured with light emitting elements C1 to Cm. Light reception elements array 14 is configured with light reception elements D1 to Dm. Light emitted from each of light emitting elements A1 to An is received by each of light reception elements B1 to Bn. Light emitted from each of light emitting elements C1 to Cm is received by each of light reception elements D1 to Dm ("n" and "m" are the natural numbers).

The distance between light reception elements array 12 and operation surface CP is more than the distance between light emitting elements array 11 and operation surface CP. Herewith, scanning light path plane SL1 at a front side end of operation surface CP is higher than scanning light path plane SL1 at the back side end of operation surface CP. Light emitting elements C1 to Cm and light reception elements D1 to Dm arranged in the Y-axis direction are placed at gradual different heights, so that to keep the heights in line with scanning light paths L1. Herewith, each of a plurality of scanning light paths L2 intersects with each of a plurality of scanning light paths L1. A plurality of scanning light paths L1 and L2 forth one scanning light path plane SL1.

Scan circuit 31 enables each of light emitting elements A1 to An and light reception elements B1 to Bn in the order left to right of operation surface CP, namely a pair of light emitting element A1 and light reception element B1, a pair of light emitting element A2 and light reception element B2, and a pair of light emitting element A3 and light reception element B3, . . . in that order. Hence scan circuit 31 acquires the amounts of light received by each of light reception elements B1 to Bn. Next, scan circuit 31 enables each of light emitting elements C1 to Cn and light reception elements D1 to Dn in the order back to front of operation surface CP, namely a pair of light emitting element C1 and light reception element D1, a pair of light emitting element C2 and light reception element D2, and a pair of light emitting element C3 and light reception element D3, . . . in that order. Hence scan circuit 31 acquires the amounts of light received by each of light reception elements D1 to Dn. Next, scan circuit 31 transmits the amounts of light received by each of light reception elements B1 to Bn and D1 to Dm to contact detection unit 32 or coordinates detection unit 33. Herewith, one scan of scanning light path plane SL1 is completed.

It is assumed that area P1 of operation surface CP is touched by a finger. In such case, scanning light path L1 a from light emitting element A8 to light reception element B8 and scanning light path L1 b from light emitting element A9 to light reception element B9 are interrupted by the finger. Similarly, scanning light path L2 a from light emitting element C6 to light reception element D6 and scanning light path L2 b from light emitting element C7 to light reception element D7 are interrupted by the finger. In consequence, the light receiving amounts of light reception element B8, B9, D6 and D7 is less than threshold value T1 (for example, 70 percent of a maximum amount of the light receiving of a light reception element) of a light receiving amount.

Contact detection unit 32 detects the light blocking of scanning light path plane SL1, when there is a light reception element where the light receiving amount is less than threshold value T1 as a result of a scan. The light blocking area is calculated based on the locations of the light reception elements where the light receiving amount is less than threshold value T1. Here, the light blocking area is calculated as "4S", based on the locations of light reception elements B8, B9, D6 and D7.

When contact detection unit 32 calculates the light blocking area, contact detection unit 32 may perform the calculation further based on the light receiving amount of another light reception element close to the light reception element where the light receiving amount is less than threshold value T1. In this case, the resolution of the calculated light blocking area improves.

In case that the calculated light blocking area is more than or equal to threshold value T2 (for example, "2S") of a light blocking area, contact detection unit 32 determines that an operation body comes in contact with operation surface CP, and transmits a contact detection signal to coordinates detection unit 33. On the other hand, in case that the calculated light blocking area is less than threshold value T2, contact detection unit 32 determines foreign material adheres to operation surface CP, and does not transmit a contact detection signal.

When receiving the contact detection signal from contact detection unit 32, coordinates detection unit 33 identifies area P1 of the light blocking, based on the locations of light reception elements B8, B9, D6 and D7. Coordinates detection unit 33 detects the coordinates of the center of area P1 as the coordinates of the location where the operation body contact. Coordinates detection unit 33 transmits the coordinates to the control unit of image forming apparatus.

Next, the advantages of the embodiment will be described.

Figure 6:
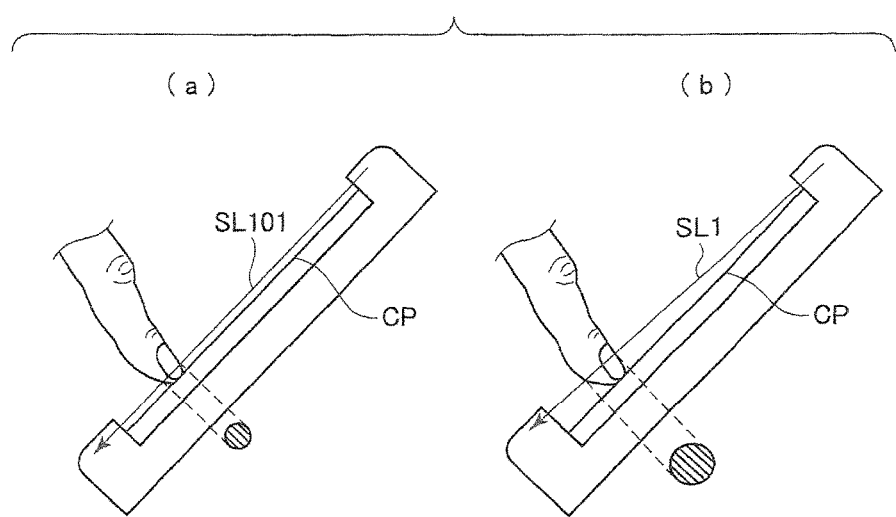
FIG. 6 schematically shows the relationship between a scanning light path plane and a light blocking area.

FIG. 6 schematically shows the relationship between a scanning light path plane and a light blocking area. In the figure, (a) shows the relationship between a scanning light path plane and light blocking area in a conventional touch panel inputting device, and (b) shows the relationship between a scanning light path plane and light blocking area in operation panel device 1 of this embodiment.

Referring to FIG. 6(a), according to the conventional touch panel inputting device, scanning light path plane SL101 is parallel with operation surface CP. When a user touches operation surface CP by a fingertip, the touch is hard to be detected since the light blocking area is small.

Referring to FIG. 6(b), according to operation panel device 1 of this embodiment, scanning light path plane SL1 slops with respect to operation surface CP. Although a user touches operation surface CP by a fingertip, the light of the scanning light paths of scanning light path plane SL1 is blocked by a thick part of the finger. Hence, the light blocking area is large. Herewith, the margin with respect to a threshold value of the light blocking area created by a fingertip increases. In consequence, the responsiveness of an operation improves.

In addition, as shown in FIG. 3, in case that scanning light path plane SL1 at a front side end of operation surface CP is higher than scanning light path plane SL1 at the back side end of operation surface CP and a user touches operation surface CP at a part of the front side, light of scanning light paths of scanning light path plane SL1 is easily blocked by a thick part of the finger. Namely, the difference between a light blocking area created by a touch of operation surface CP at a part of the back side and a light blocking area created by a touch of operation surface CP at a part of the front side is small. In consequence, the constant operational feeling in all field of operation surface CP is achieved. In addition, the failure of the touch detection, the failure of the release during scrolling, or the like is prevented.

[The Second Embodiment]

Firstly, a structure of touch panel 10 of operation panel device 1 of this embodiment and basic behavior of operation panel device 1 will be explained.

Figure 7:
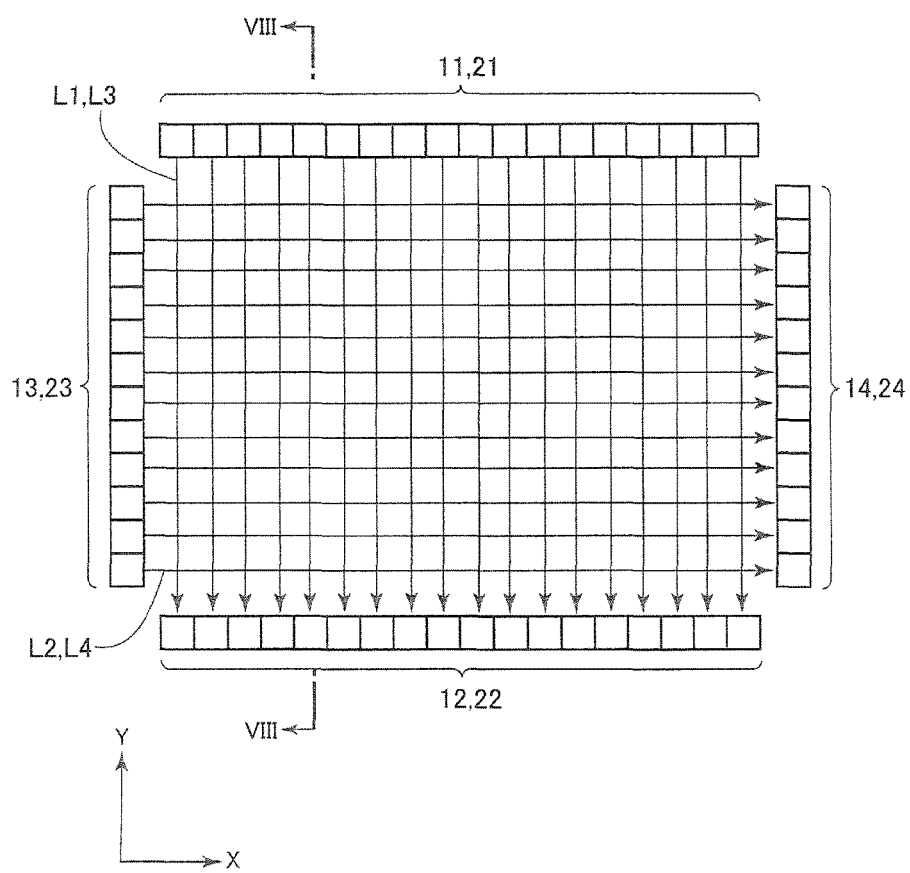
FIG. 7 schematically shows a plain view of the first structure of touch panel 10 of the second embodiment of this invention.
Figure 8:
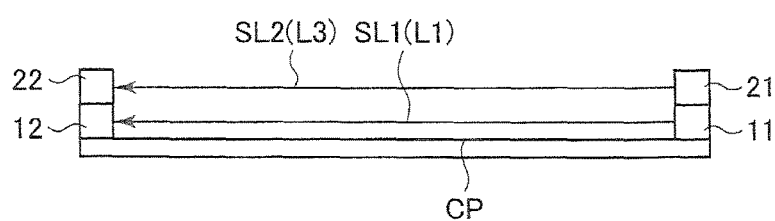
FIG. 8 shows a cross sectional diagram of the line VIII-VIII of FIG. 7.
Figure 9:
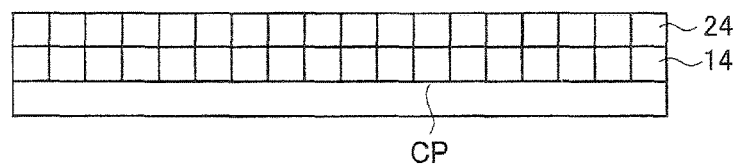
FIG. 9 schematically shows a right side view of the first structure of touch panel 10 of the second embodiment of this invention.

FIG. 7 schematically shows a plain view of the first structure of touch panel 10 of the second embodiment of this invention. FIG. 8 shows a cross sectional diagram of the line VIII-VIII of FIG. 7. FIG. 9 schematically shows a right side view of the first structure of touch panel 10 of the second embodiment of this invention.

Referring to FIG. 7 to FIG. 9, touch panel 10 having the first structure is placed on operation surface CP. Touch panel 10 includes light emitting elements arrays 11 and 21, light reception elements arrays 12 and 22, light emitting elements arrays 13 and 23, and light reception elements arrays 14 and 24. Light emitting elements arrays 11 and 21 are configured with a plurality of light emitting elements arranged in the X-axis direction. Light reception elements arrays 12 and 22 are configured with a plurality of light reception elements arranged in the X-axis direction. Light emitting elements arrays 13 and 23 are configured with a plurality of light emitting elements arranged in the Y-axis direction. Light reception elements arrays 14 and 24 are configured with a plurality of light reception elements arranged in the Y-axis direction. Light emitting elements arrays 11 and 21 are installed at the back side end of operation surface CP. Light reception elements arrays 12 and 22 are installed at the front side end of operation surface CP. Light emitting elements arrays 13 and 23 is installed at the left end of operation surface CP. Light reception elements arrays 14 and 24 are installed at the right end of operation surface CP.

A plurality of scanning light paths L1 formed by light emitting elements array 11 and light reception elements array 12, and a plurality of scanning light paths L2 formed by light emitting elements array 13 and light reception elements array 14 are at right angles to each other. A plurality of scanning light paths L1 and scanning light path L2 form scanning light path plane SL1 (an example of a lower scanning light path plane) which is a flat surface and parallel to operation surface CP.

Light emitting elements array 21 is stacked on an upper part of light emitting elements array 11. Light reception elements array 22 is stacked on an upper part of light reception elements array 12. Light emitting elements array 23 is stacked on an upper part of light emitting elements array 13. Light reception elements array 24 is stacked on an upper part of light reception elements array 14. Light emitting elements array 21 and light reception elements array 22 face each other and form a plurality of scanning light paths L3. Each of a plurality of scanning light paths L3 is the path on which light emitted by each of a plurality of light emitting elements of light emitting elements array 21 travels before it is received by each of a plurality of light reception elements of light reception elements array 22. Each of a plurality of scanning light paths L3 is in the Y-axis direction. Light emitting elements array 23 and light reception elements array 24 face each other and form a plurality of scanning light paths L4. Each of a plurality of scanning light paths L4 is the path on which light emitted by each of a plurality of light emitting elements of light emitting elements array 23 travels before it received by each of a plurality of light reception elements of light reception elements array 24. Each of a plurality of scanning light paths L4 is in the X-axis direction.

A plurality of scanning light paths L3 and a plurality of scanning light paths L4 are at right angles to each other. A plurality of scanning light paths L3 and a plurality of scanning light paths L4 form scanning light path plane SL2 (an example of an upper scanning light path plane) which is a flat surface and parallel to operation surface CP. Scanning light path plane SL2 is located higher than scanning light path plane SL1. In other words, the distance between scanning light path plane SL2 and operation surface CP is more than the distance between scanning light path plane SL1 and operation surface CP.

Operation panel device 1 switches, by using scan circuit 31, between scanning light path plane SL1 and scanning light path plane SL2, as a scanning light path plane used for detection of the contact of the operation body, based on an installation state of the touch panel, an operation method of the user, or the like. When detecting the contact of an operation body by using scanning light path plane SL1, operation panel device 1 disables all of light emitting elements of light emitting elements arrays 21 and 23 and light reception elements of light reception elements arrays 22 and 24, and enables the light emitting elements of light emitting elements arrays 11 and 13, and light reception elements of light reception elements arrays 12 and 14 in order. When detecting the contact of an operation body by using scanning light path plane SL2, operation panel device 1 disables all of light emitting elements of light emitting elements arrays 11 and 13 and light reception elements of light reception elements arrays 12 and 14, and enables the light emitting elements of light emitting elements arrays 21 and 23, and light reception elements of light reception elements arrays 22 and 24 in order.

Touch panel 10 of the embodiment may be configured with the second and the third structure below, as substitute for the first structure as shown in FIGS. 7 to 9.

Figure 10:
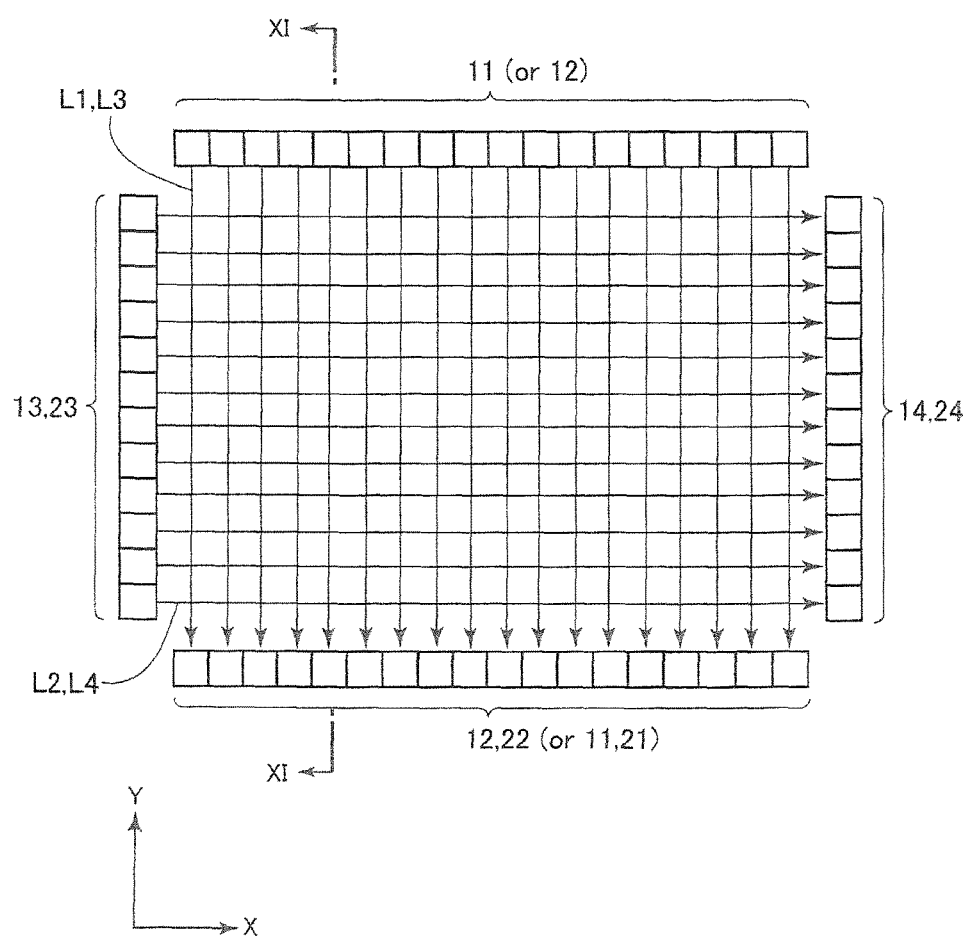
FIG. 10 schematically shows a plain view of the second and the third structure of touch panel 10 of the second embodiment of this invention.
Figure 11:
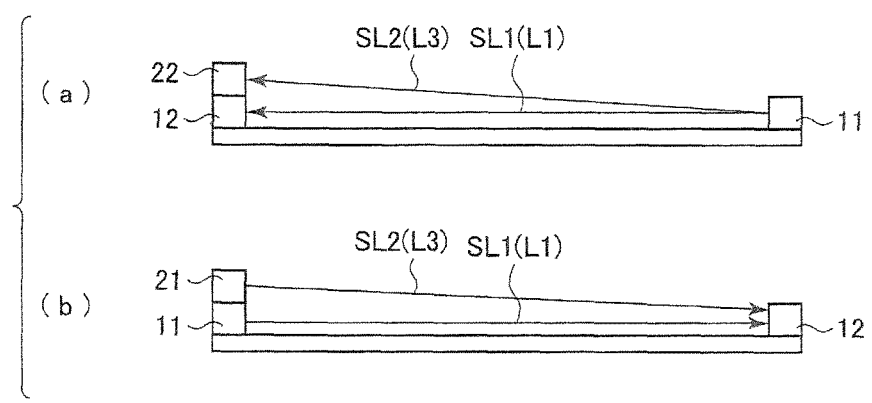
FIG. 11 shows a cross sectional diagram of the line XI-XI of FIG. 10.

FIG. 10 schematically shows a plain view of the second and the third structure of touch panel 10 of the second embodiment of this invention. FIG. 11 shows a cross sectional diagram of the line XI-XI of FIG. 10. In the figure, (a) shows a cross sectional diagram of the second structure, and (b) shows a cross sectional diagram of the third structure. In FIG. 10, arrows L1 and L3 means the direction of scanning light path of the second structure.

Referring to FIGS. 10 and 11(a), touch panel 10 having the second structure contains scanning light path plane SL1 and scanning light path plane SL2. Scanning light path plane SL1 is parallel to operation surface CP. Scanning light path plane SL2 slopes with respect to operation surface CP. Scanning light path plane SL2 is located higher than scanning light path plane SL1. Touch panel 10 having the second structure does not include light emitting elements array 21 (in FIG. 8). Touch panel 10 having the second structure includes light emitting elements array 11, light reception elements arrays 12 and 22, light emitting elements arrays 13 and 23, and light reception elements arrays 14 and 24. Light emitting elements array 11 is configured with a plurality of light emitting elements arranged in a linear fashion in the X-axis direction. Light reception elements arrays 12 and 22 are configured with a plurality of light reception elements arranged in a linear fashion in the X-axis direction. Light emitting elements arrays 13 and 23 are configured with a plurality of light emitting elements arranged in a linear fashion in the Y-axis direction. Light reception elements arrays 14 and 22 are configured with a plurality of light reception elements arranged in a linear fashion in the Y-axis direction.

A plurality of scanning light paths L3 are formed by light emitting elements array 11 and light reception elements array 22. More specifically, light emitted by each of light emitting elements of light emitting elements array 11 is received by each of light reception elements of light reception elements array 22. A plurality of scanning light paths L3 and a plurality of scanning light paths L4 are at right angles to each other, where scanning light paths L4 are formed by light emitting elements array 23 and light reception elements array 24. A plurality of scanning light paths L3 and a plurality of scanning light paths L4 form scanning light path plane SL2 which is flat and slopes with respect to operation surface CP.

Operation panel device 1 switches, by using scan circuit 31, between scanning light path plane SL1 and scanning light path plane SL2, as a scanning light path plane used for detection of the contact of the operation body, based on an installation state of the touch panel, an operation method of the user, or the like. When detecting the contact of an operation body by using scanning light path plane SL1, operation panel device 1 disables all of light emitting elements of light emitting elements array 23 and light reception elements of light reception elements arrays 22 and 24, and enables the light emitting elements of light emitting elements arrays 11 and 13, and light reception elements of light reception elements arrays 12 and 14 in order. When detecting the contact of an operation body by using scanning light path plane SL2, operation panel device 1 disables all of light emitting elements of light emitting elements array 13 and light reception elements of light reception elements arrays 12 and 14, and enables the light emitting elements of light emitting elements arrays 11 and 23, and light reception elements of light reception elements arrays 22 and 24 in order.

Referring to FIGS. 10 and 11(b), touch panel 10 having the third structure contains scanning light path plane SL1 and scanning light path plane SL2. Scanning light path plane SL1 is parallel to operation surface CP. Scanning light path plane SL2 slopes with respect to operation surface CP. Scanning light path plane SL2 is located higher than scanning light path plane SL1. Touch panel 10 having the third structure does not include light reception elements array 22 (in FIG. 8). Touch panel 10 having the third structure includes light emitting elements arrays 11 and 21, light reception elements array 12, light emitting elements arrays 13 and 23, and light reception elements arrays 14 and 24. Light emitting elements arrays 11 and 21 are configured with a plurality of light emitting elements arranged in a linear fashion in the X-axis direction. Light reception elements array 12 is configured with a plurality of light reception elements arranged in a linear fashion in the X-axis direction. Light emitting elements arrays 13 and 23 are configured with a plurality of light emitting elements arranged in a linear fashion in the Y-axis direction. Light reception elements arrays 14 and 22 are configured with a plurality of light reception elements arranged in a linear fashion in the Y-axis direction. Light emitting elements arrays 11 and 21 are installed at a front side end of operation surface CP. Light reception elements array 12 is installed at the back side end of operation surface CP.

A plurality of scanning light paths L3 are formed by light emitting elements array 21 and light reception elements array 12. More specifically, light emitted by each of light emitting elements of light emitting elements array 21 is received by each of light reception elements of light reception elements array 12. A plurality of scanning light paths L3 and a plurality of scanning light paths L4 are at right angles to each other, where scanning light paths L4 are formed by light emitting elements array 23 and light reception elements array 24. A plurality of scanning light paths L3 and a plurality of scanning light paths L4 form scanning light path plane SL2 which is flat and slopes with respect to operation surface CP.

Operation panel device 1 switches, by using scan circuit 31, between scanning light path plane SL1 and scanning light path plane SL2, as a scanning light path plane used for detection of the contact of the operation body, based on an installation state of the touch panel, an operation method of the user, or the like. When detecting the contact of an operation body by using scanning light path plane SL1, operation panel device 1 disables all of light emitting elements of light emitting elements arrays 21 and 23 and light reception elements of light reception elements array 24, and enables the light emitting elements of light emitting elements arrays 11 and 13, and light reception elements of light reception elements arrays 12 and 14 in order. When detecting the contact of an operation body by using scanning light path plane SL2, operation panel device 1 disables all of light emitting elements of light emitting elements arrays 11 and 13 and light reception elements of light reception elements array 14, and enables the light emitting elements of light emitting elements arrays 21 and 23, and light reception elements of light reception elements arrays 12 and 24 in order.

The above operation panel device 1 may have scanning light path planes more than or equal to 3.

Since the structures and behavior of operation panel device 1, and the structures and behavior of image forming apparatus 100 configured with operation panel device 1 except for the above mentioned are same as the first embodiment. Then, the explanation is not repeated.

Next, the first to the fourth behavior of operation panel device 1 of the second embodiment of this invention will be explained in detail. Touch panel 10 of operation panel device 1 which performs the first to the fourth behavior may have any of the first to the third structures above. Operation panel device 1 may perform at least one of the first to the fourth behavior.

Figure 12:
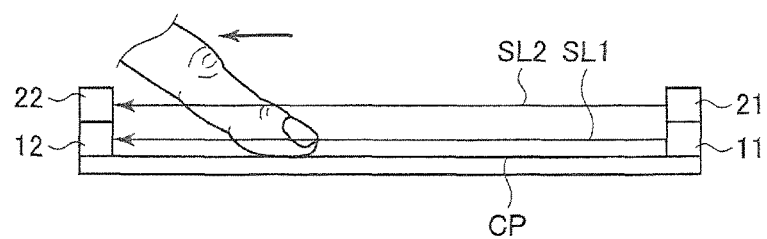
FIG. 12 shows the first behavior of operation panel device 1 of the second embodiment of this invention.

FIG. 12 shows the first behavior of operation panel device 1 of the second embodiment of this invention.

Referring to FIG. 12, the first behavior is behavior when a user performs a flick operation (a screen scrolling operation) on operation surface CP. Firstly, operation panel device 1 detects presence of contact of an operation body by using scanning light path plane SL1. When a user performs a touch as a start point of the flick operation, operation panel device 1 detects light blocking by scanning light path plane SL1, and detects the contact on operation surface CP based on the light blocking area on scanning light path plane SL1. Next, operation panel device 1 identifies the location where the finger of the user contacts, and detects presence of the movement of the identified location.

When a user begins to move the finger, operation panel device 1 detects the movement of the identified location. Then, operation panel device 1 switches from scanning light path plane SL1 to scanning light path plane SL2, as a scanning light path plane used for contact presence detection of an operation body. Only if the finger of the user keeps in contact with operation surface CP, the contact with operation surface CP continues to be detected. When detecting the start of the movement of identified location, operation panel device 1 makes the identified location as a starting point of the movement.

When the user finished moving the finger on operation surface CP and moved the finger away from operation surface CP, operation panel device 1 no longer detects light blocking on scanning light path plane SL2. When a light blocking area on scanning light path plane SL2 is less than threshold value T2, operation panel device 1 detects the finger is away from operation surface CP. Operation panel device 1 identifies the location where the finger is taken away from operation surface CP, and makes the identified location as an end point of the movement.

Figure 13:
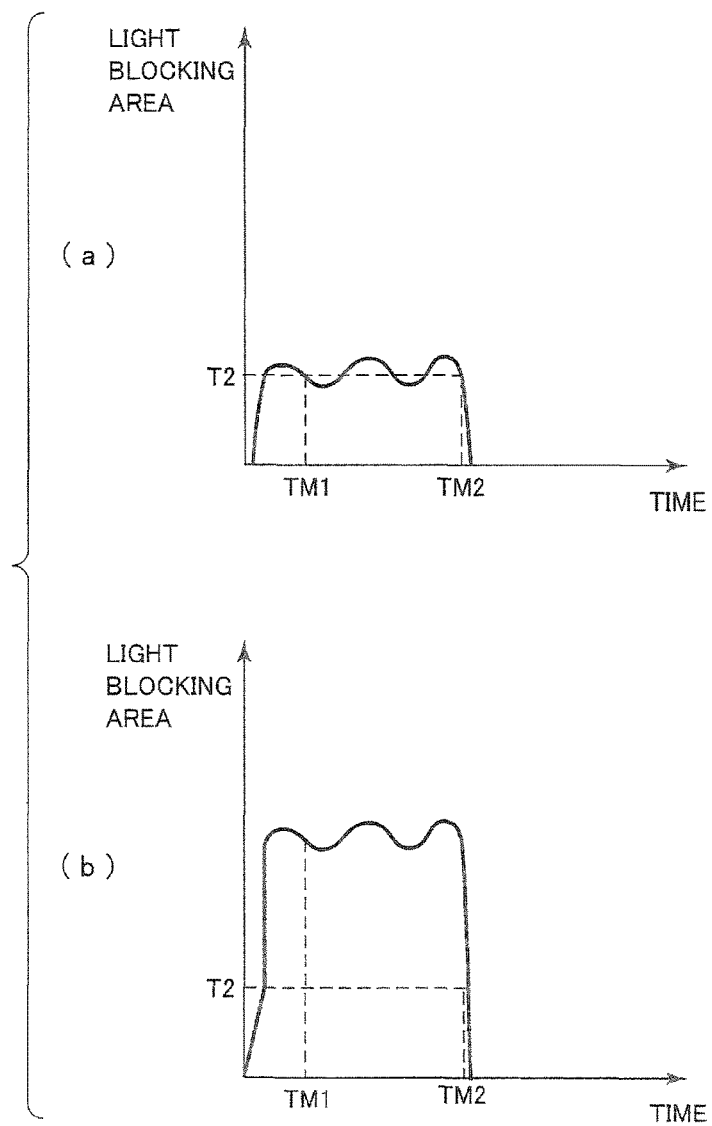
FIG. 13 schematically shows the change of the light blocking area over time, when a flick operation is performed.

FIG. 13 schematically shows the change of the light blocking area over time, when a flick operation is performed. In the Figure, (a) shows the change of the light blocking area on scanning light path plane SL1 over time, and (b) shows the change of the light blocking area on scanning light path plane SL2 over time.

Referring to FIG. 13, when a user moves the finger on the operation surface in a flick operation for example, the finger may be temporarily taken away from the operation surface during the movement. This action causes fluctuations of the light blocking area.

When operation panel device 1 determines whether the finger of the user is away from the operation surface based on the detection result on scanning light path plane SL1, as shown FIG. 13(*a*), a light blocking area on scanning light path plane SL1 is less than threshold value T2 at the time TM1 when the finger of the user is temporarily taken away. In consequence, operation panel device 1 misdetects the finger location of time TM1 as an end of the movement.

On the other hand, when operation panel device 1 determines whether the finger of the user is away from the operation surface based on the detection result on scanning light path plane SL2, as shown FIG. 13(*b*), a light blocking area on scanning light path plane SL2 is not less than threshold value T2 at the time TM1 when the finger of the user is temporarily taken away. In consequence, operation panel device 1 correctly determines the finger location at time TM2 when the user moves the finger away from the operation surface as the end point of the movement.

Figure 14:
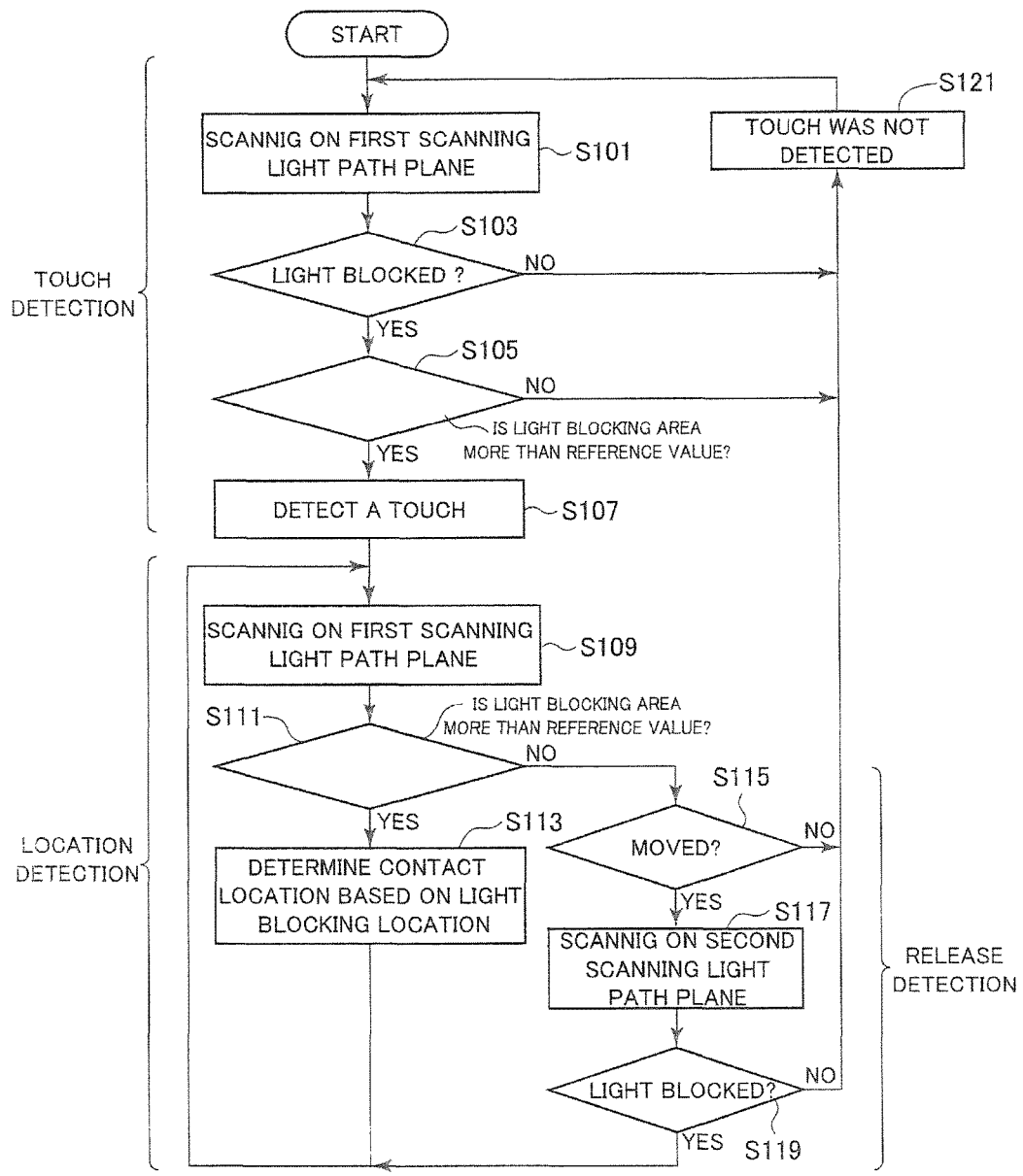
FIG. 14 shows a flowchart of the first behavior of operation panel device 1 of the second embodiment of this invention FIG. 15 schematically shows the relationship between the angle of operation surface CP and the finger touching operation surface CP.

FIG. 14 shows a flowchart of the first behavior of operation panel device 1 of the second embodiment of this invention Referring to FIG. 14, when the power-on, control unit 30 of operation panel device 1 begins scanning on scanning light path plane SL1 (the first scanning light path plane) (S101). Next, control unit 30 determines whether a light blocking is detected or not on scanning light path plane SL1 (S103).

At step S103, in case that control unit 30 determined that a light blocking is detected on scanning light path plane SL1 (YES at S103), control unit 30 determines whether the light blocking area is more than or equal to a reference value (threshold value T2) (S105).

At step S105, in case that control unit 30 determined that the light blocking area is more than or equal to the reference value (YES at S105), control unit 30 detects the light blocking as a touch (S107), and steps in the process of step S109.

At step S103, in case that control unit 30 determined that a light blocking is not detected on scanning light path plane SL1 (NO at S103), or at step S105, in case that control unit 30 determined that the light blocking area is less than the reference value (NO at S105), control unit 30 does not detect a light blocking of a touch (S121), and steps in the process of step S101.

At step S109, control unit 30 starts scanning on scanning light path plane SL1 again (S109), and determines whether the light blocking area is more than or equal to a reference value (threshold value T2) (S111).

At step S111, in case that control unit 30 determined that the light blocking area is more than or equal to the reference value (YES at S111), control unit 30 determines the contact location based on the light blocking location (S113), and steps in the process of step S109.

At step S111, in case that control unit 30 determined that the light blocking area is less than a reference value (NO at S111), control unit 30 determines whether the contact location moves or not (S115).

At step S115, in case that control unit 30 determined that the contact location moves (YES at S115), control unit 30 begins scanning on scanning light path plane SL2(the second scanning light path plane) (S117). Next, control unit 30 determines whether a light blocking is detected or not on scanning light path plane SL2 (S119).

At step S119, in case that control unit 30 determined that the light blocking is detected on scanning light path plane SL2 (YES at S119), it means that the user continues to move the finger on the operation surface. In this case, control unit 30 steps in the process of step S109.

At step S119, in case that control unit 30 determined that a light blocking is not detected on scanning light path plane SL2 (NO at S119), it means that the user took the finger away from the operation surface. In this case, control unit 30 does not detect a light blocking of a touch (S121), and steps in the process of step S101.

Next, the second behavior of operation panel device 1 will be explained. According to the second behavior, a scanning light path plane for detecting contact on the operation surface is switched, based on an angle of the operation surface.

Figure 15:
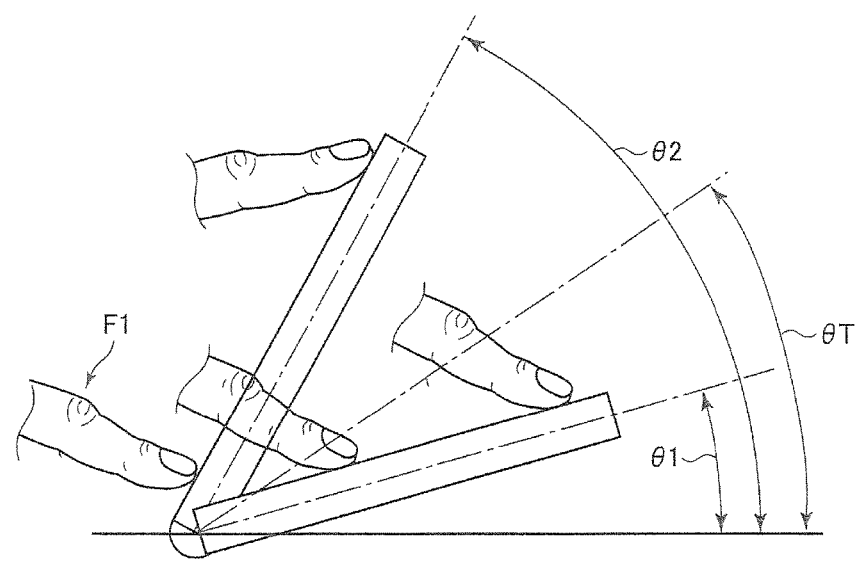

FIG. 15 schematically shows the relationship between the angle of operation surface CP and the finger touching operation surface CP.

Referring to FIG. 15, many image forming apparatuses 100 can change an angle of operation panel device 1. It is necessary to care about an angle of operation panel device 1 which can changes the angle.

In FIG. 15, the situations that the inclination angle of operation surface CP with respect to the horizontal plane is angle θ1 and angle θ2 are illustrated. Angle θ1 is smaller than angle θ2. When the inclination angle is angle θ1, operation surface CP is approximately horizontal. In this case, a user tends to touch operation surface CP with the ball of a finger wherever the touched location is on operation surface CP. On the other hand, when the inclination angle is angle θ2, operation surface CP is approximately vertical. In this condition, when the touch location is at a part of the back side of operation surface CP, a user tends to touch operation surface CP with the ball of a finger. When the touch location is at a part of the front side of operation surface CP (a touch indicated by arrow F1), a user tends to touch operation surface CP with a fingertip.

Figure 16:
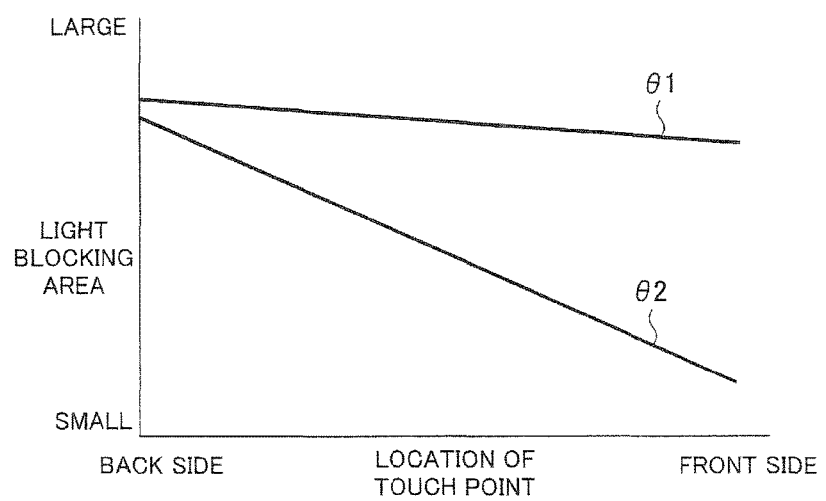
FIG. 16 schematically shows the relationship between the angle of operation surface CP and a light blocking area.

FIG. 16 schematically shows the relationship between the angle of operation surface CP and a light blocking area.

Referring to FIGS. 15 and 16, in case that the inclination angle is angle θ1, a user easily moves the wrist and the arm which is supporting points of the finger used for the operation. Hence, a change of the operation angle of the finger, depend on the change of the location of the touch point on operation surface CP, is small. The amount of change of the light blocking area depend on the change of the location of the touch point is small. On the other hand, in case that the inclination angle is angle θ2, a light blocking area at the back side of operation surface CP is relatively large. A light blocking area at the front side of operation surface CP is relatively small. Then, when a user touches operation surface CP as shown by arrow F1, the light blocking area is small and the touch is hard to be detected.

To detect a touch as shown by arrow F1 easily, operation panel device 1 perform the below behavior as the second behavior. Operation panel device 1 acquires the inclination angle of operation surface CP with respect to the horizontal plane by using angle acquire unit 50. Then, operation panel device 1 switches a scanning light path plane for detecting the contact on operation surface CP to scanning light path plane SL2, in case that the inclination angle is more than or equal to a reference value θT. Operation panel device 1 switches a scanning light path plane for detecting the contact on operation surface CP to scanning light path plane SL1, in case that the inclination angle is less than a reference value θT.

Operation panel device 1 preferably adopts the third structure as shown in FIG. 11(b), in case that operation panel device 1 performs the second behavior.

In case that operation panel device 1 performs the second behavior, the above mentioned tendencies may not be shown, depend on the install location of operation panel device 1, the body height of a user, or the like. Hence, after operation panel device 1 switched a scanning light path plane for detecting the contact on operation surface CP to scanning light path plane SL1based on the inclination angle, operation panel device 1 may switch the scanning light path plane for detecting the contact on operation surface CP to scanning light path plane SL2, if the light blocking area is small.

Figure 17:
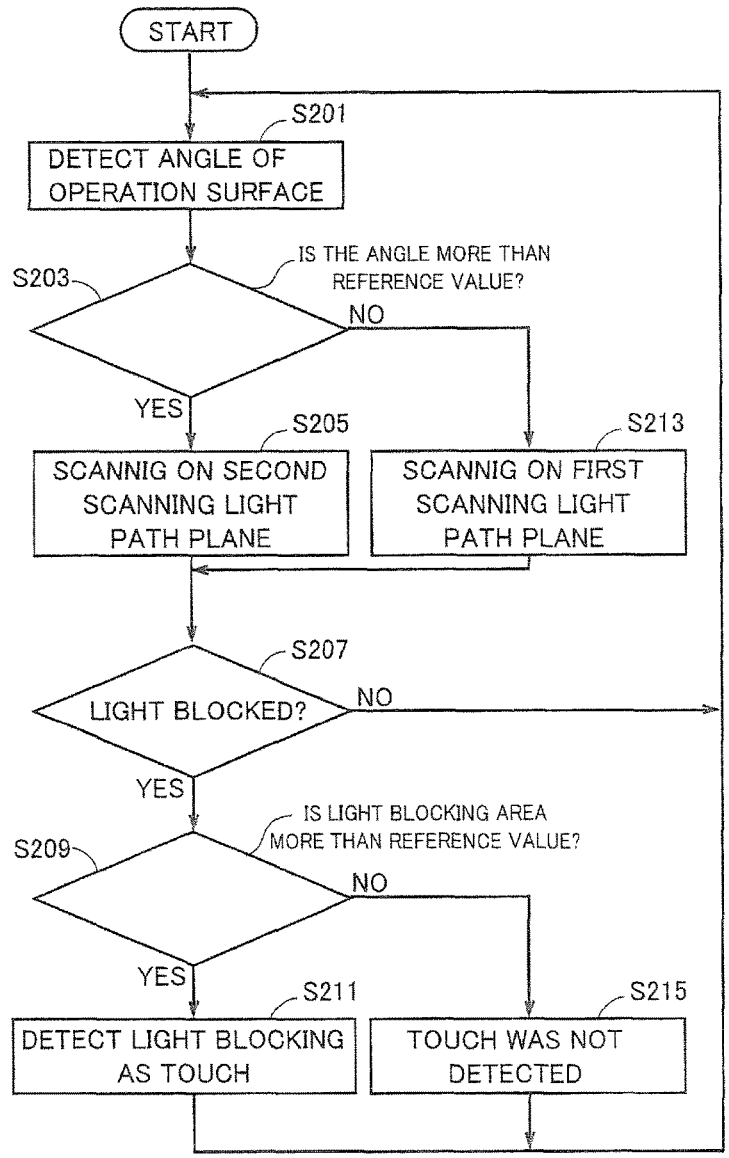
FIG. 17 shows a flowchart of the second behavior of operation panel device 1 of the second embodiment of this invention.

FIG. 17 shows a flowchart of the second behavior of operation panel device 1 of the second embodiment of this invention.

Referring to FIG. 17, when the power-on, control unit 30 of operation panel device 1 acquires the inclination angle of operation surface CP (S201). Control unit 30 determines whether the inclination angle is more than or equal to reference value θT (S203).

At step S203, in case that Control unit 30 determined that the inclination angle is more than or equal to reference value θT (YES at S203), control unit 30 begins scanning on scanning light path plane SL2 (the second scanning light path plane) (S205), and steps in the process of step S207. On the other hand, at step S203, in case that Control unit 30 determined that the inclination angle is less than a reference value θT (NO at S203), control unit 30 begins scanning on scanning light path plane SL1 (the first scanning light path plane) (S213), and steps in the process of step S207.

At step S207, control unit 30 determines whether light blocking is detected or not on the scanning light path plane scanned (S207).

At step S207, in case that control unit 30 determined that light blocking is detected on the scanning light path plane scanned (YES at S207), control unit 30 determines whether the light blocking area is more than or equal to a reference value (S209). On the other hand, at step S207, in case that control unit 30 determined that light blocking is not detected on the scanning light path plane scanned (NO at S207), control unit 30 steps in the process of step S201.

At step S209, in case that control unit 30 determined that the light blocking area is more than or equal to a reference value (YES at S209), control unit 30 detects the light blocking as a touch (S211), and steps in the process of step S201.

At step S209, in case that control unit 30 determined that the light blocking area is less than the reference value (NO at S209), control unit 30 does not detect the light blocking as a touch (S215), and steps in the process of step S201.

Next, the third behavior of the operation panel device 1 will be explained. In accordance with the third behavior, a scanning light path planes for detecting the contact on the operation surface is switched, based on the size of the key displayed at the contact point where an operation body was detected.

Figure 18:
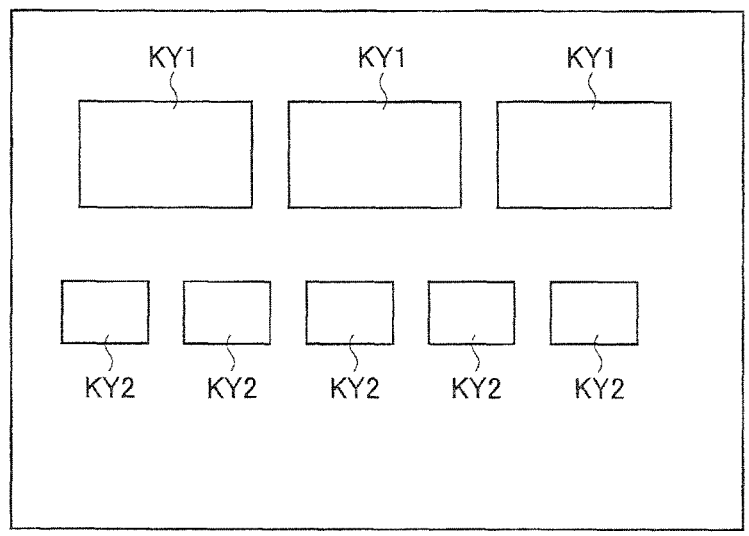
FIG. 18 schematically shows an example of an operation screen displayed on operation surface CP.

FIG. 18 schematically shows an example of an operation screen displayed on operation surface CP.

Referring to FIG. 18, the operation screen includes a plurality of keys KY1 and KY2. The size of each of keys KY1 is relatively large. The size of each of keys KY2 is relatively small.

Figure 19:
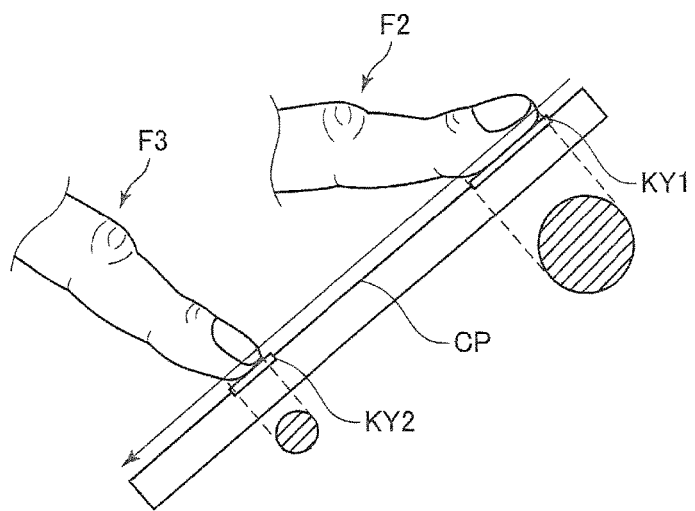
FIG. 19 schematically shows the relationship between the size of a key and a light blocking area.

FIG. 19 schematically shows the relationship between the size of a key and a light blocking area.

Referring to FIG. 19, when touching a relatively large key such as key KY1, a user tends to touch the key certainly by using the ball of a finger in a similar manner of a usual screen operation as shown by arrow F2. In consequence, the light blocking area is large. On the other hand, when touching a relatively small key such as key KY2, a user tends to touch the key, aiming at the key by using a fingertip as shown by arrow F3. In consequence, the light blocking area is small.

Operation panel device 1 performs the following behavior as the third behavior. Operation panel device 1 switches a scanning light path plane for detecting the contact on operation surface CP to scanning light path plane SL1, and detects presence of light blocking on scanning light path plane SL1. In case that operation panel device 1 detects light blocking on scanning light path plane SL1, operation panel device 1 identifies the size of the key displayed at the light blocking location, by acquiring information of the operation screen displayed on operation surface CP from ROM etc. In case that the size of the identified key is less than threshold value T3, operation panel device 1 switches a scanning light path plane for detecting the contact on the operation surface to scanning light path plane SL2. Operation panel device 1 detects presence of the contact on the operation surface based on the light blocking area of scanning light path plane SL2. Herewith, the touches on small keys are easily detected and the constant operation feeling can be achieved.

Figure 20:
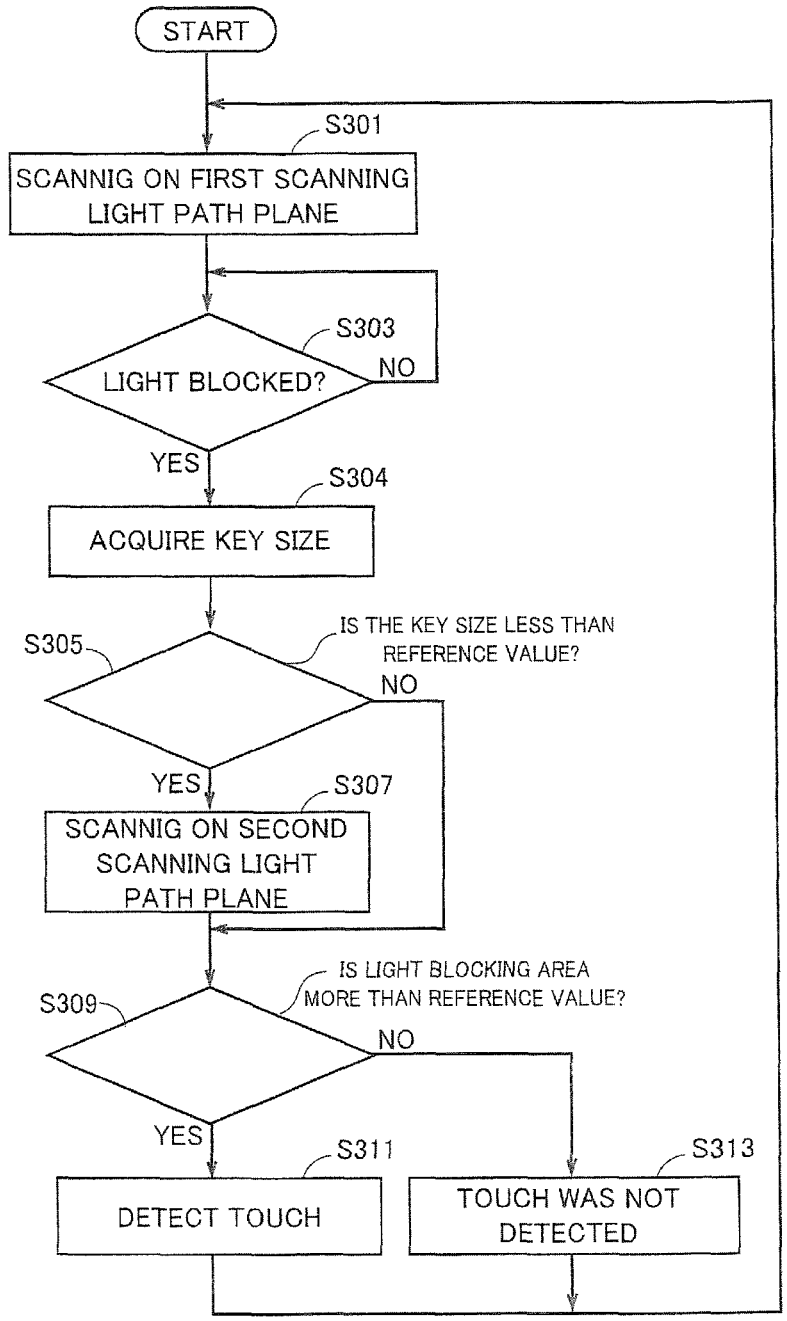
FIG. 20 shows a flowchart of the third behavior of operation panel device 1 of the second embodiment of this invention.

FIG. 20 shows a flowchart of the third behavior of operation panel device 1 of the second embodiment of this invention.

Referring to FIG. 20, when the power-on, control unit 30 of operation panel device 1 begins scanning on scanning light path plane SL1 (the first scanning light path plane) (S301). Next, control unit 30 determines whether a light blocking is detected or not on scanning light path plane SL1 (S303). Control unit 30 repeats the process of step S303, until the light blocking is detected.

At step S303, in case that control unit 30 determined that a light blocking is detected on scanning light path plane SL1 (YES at S303), control unit 30 acquires the size of the key displayed at the light blocking location (S304). Control unit 30 determines whether the size of the key displayed at the light blocking location is less than threshold value T3 or not (S305).

At step S305, in case that control unit 30 determined that the size of the key displayed at the light blocking location is less than threshold value T3 (YES at S305), control unit 30 switches a scanning light path plane for detecting the contact on operation surface CP to scanning light path plane SL2 (the second scanning light path plane), begins the scanning (S307), and steps in the process of step S309. On the other hand, in case that control unit 30 determined that the size of the key displayed at the light blocking location is more than or equal to threshold value T3 (NO at S305), control unit 30 does not switches a scanning light path plane, and steps in the process of step S309.

At step S309, control unit 30 determines whether the light blocking area on the scanning light path plane scanned is more than or equal to a reference value or not (S309).

At step S309, in case that control unit 30 determined that the light blocking area is more than or equal to the reference value (YES at S309), control unit 30 detects the light blocking as a touch (S311), and steps in the process of step S 301.

At step S309, in case that control unit 30 determined that the light blocking area is less than the reference value (NO at S309), control unit 30 does not detect the light blocking as a touch (S313), and steps in the process of step S 301.

Next, the fourth behavior of operation panel device 1 will be explained. According to the fourth behavior, a scanning light path plane for detecting the contact on the operation surface is switched based on the number of contact points where operation bodies were detected.

Figure 21:
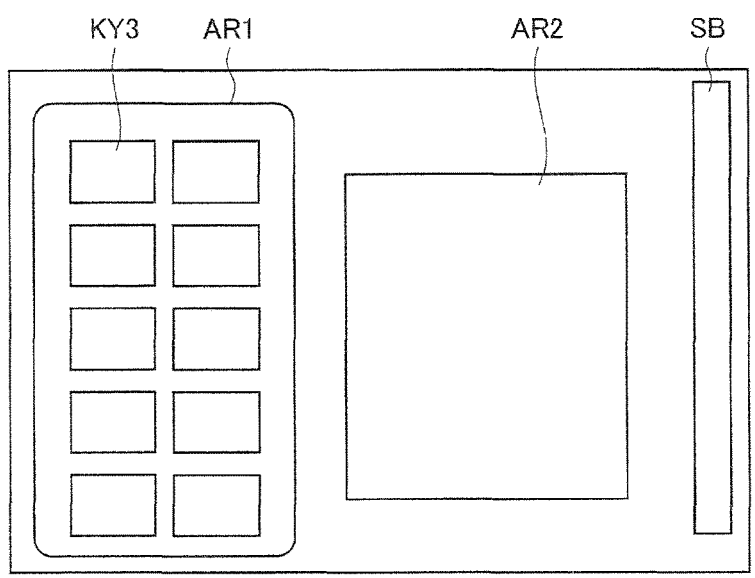
FIG. 21 schematically shows another example of an operation screen displayed on operation surface CP.

FIG. 21 schematically shows another example of an operation screen displayed on operation surface CP.

Referring to FIG. 21, the operation screen includes area AR1, area AR2 and scroll bar SB. Area AR1 is a key area where a plurality of keys KY3 is displayed. Area AR1 is for receiving a single touch operation of keys KY3. Area AR2 is a preview area for displaying a preview image. Scroll bar SB is for receiving scroll operations in the operation screen.

Figure 22:
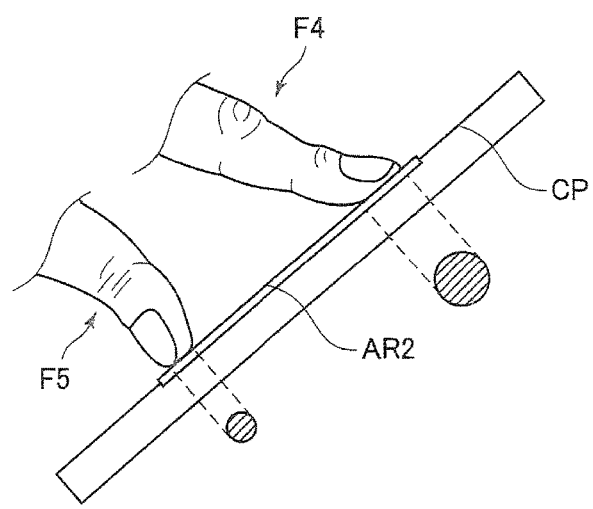
FIG. 22 schematically shows the light blocking areas of a multi touch operation.

FIG. 22 schematically shows the light blocking areas of a multi touch operation.

Referring to FIG. 22, a single touch operation is usually performed by one finger. In a single touch operation, a large and stable light blocking area is acquired, since the pushing force on operation surface CP is concentrated into the one finger.

On the other hand, a multi touch operation on area AR2 is performed by plural fingers. For example, according to the multi touch operation of the fingers indicated by arrows F 4 and F5, the pushing force on operation surface CP is ununiformly distributed to the two fingers. In consequence, the pushing force of the finger indicated by arrow F5 on operation surface CP is weak, and the light blocking area is small.

To easily detect a multi touch operation, operation panel device 1 performs the following behavior as the fourth behavior. Operation panel device 1 switches a scanning light path plane for detecting the contact on operation surface CP to scanning light path plane SL1, and detects presence of light blocking on scanning light path plane SL1. Operation panel device 1 acquires the number of points of light blocking when detecting light blocking on scanning light path plane SL1. In case that the acquired number is plural, operation panel device 1 switches a scanning light path plane for detecting the contact on the operation surface to scanning light path plane SL2, and operation panel device 1 detects presence of the contact on the operation surface based on the light blocking area on scanning light path plane SL2. Herewith, the light blocking area where a multi touch operation is performed is large, and the multi touch operation is easily detected.

Operation panel device 1 preferably adopts the first structure as shown in FIGS. 7 to 9, in case that operation panel device 1 performs the fourth behavior.

Figure 23:
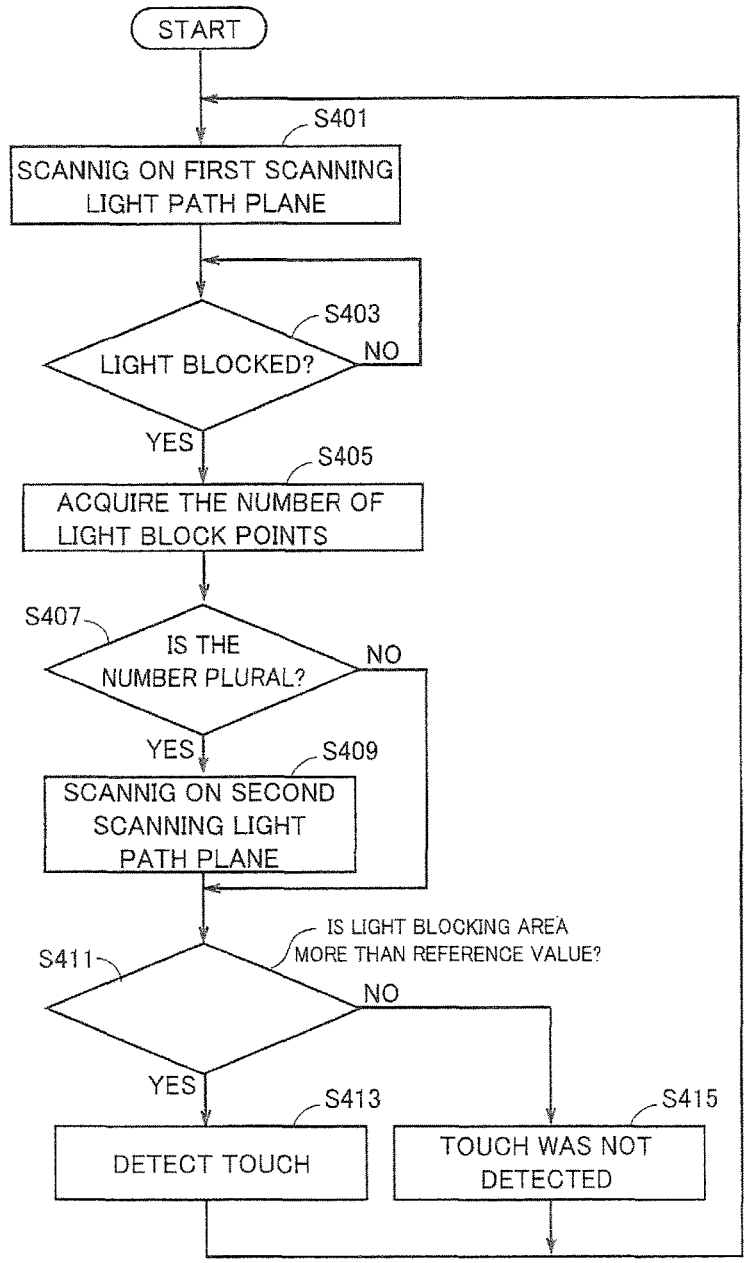
FIG. 23 shows a flowchart of the fourth behavior of operation panel device 1 of the second embodiment of this invention.

FIG. 23 shows a flowchart of the fourth behavior of operation panel device 1 of the second embodiment of this invention.

Referring to FIG. 23, when the power-on, control unit 30 of operation panel device 1 begins scanning on scanning light path plane SL1 (the first scanning light path plane) (S401). Next, control unit 30 determines whether a light blocking is detected or not on scanning light path plane SL1 (S403). Control unit 30 repeats the process of step S403, until the light blocking is detected.

At step S403, in case that control unit 30 determined that a light blocking is detected on scanning light path plane SL1 (YES at S403), control unit 30 acquires the number of the light blocking points (S405). Control unit 30 determines whether the number of the light blocking points is plural or not (S407).

At step S407, in case that control unit 30 determined that there are plural light blocking points (YES at S407), control unit 30 switches a scanning light path plane for detecting the contact on operation surface CP to scanning light path plane SL2 (the second scanning light path plane), begins the scanning (S409), and steps in the process of step S411. On the other hand, in case that control unit 30 determined that there is only one light blocking point (NO at S407), control unit 30 does not switches a scanning light path plane, and steps in the process of step S411.

At step S411, control unit 30 determines whether the light blocking area on the scanning light path plane scanned is more than or equal to a threshold value T2 or not (S309).

At step S411, in case that control unit 30 determined that the light blocking area is more than or equal to the threshold value T2 (YES at S411), control unit 30 detects the light blocking as the touch (S413), and steps in the process of step S401.

At step S411, in case that control unit 30 determined that the light blocking area is less than the threshold value T2 (NO at S411), control unit 30 does not detect the light blocking as the touch (S415), and steps in the process of step S401.

According to operation panel device 1 of this embodiment, operation panel device 1 has two scanning light path planes. Although a user touches a front side of the operation surface with a fingertip, the light blocking area is large, since the light of the scanning light path of the upper scanning light path plane is blocked by a thick part of the finger. Herewith, the margin with respect to threshold value T2 (a reference area) of the light blocking area increases, when the touch was performed by a fingertip. Namely, the difference between a light blocking area created by a touch of the operation surface at a part of the back side and a light blocking area created by a touch of the operation surface at a part of the front side is small. In consequence, the responsiveness of operations improved, and the constant operational feeling is achieved. In addition, the failure of the touch detection, the failure of the release during scrolling, or the like is prevented.

In addition, by switching a scanning light path plane for detecting the contact on the operation surface, the touch on the operation surface is detected effectively, and the power consumption is reduced.

According to the first and second embodiments above mentioned, a touch panel inputting device with improved responsiveness of operations can be provided.

[Others]

In the first and second embodiments above mentioned, the position of light emitting elements array and the position of the light reception elements array which face each other can be shuffled.

Figure 24:
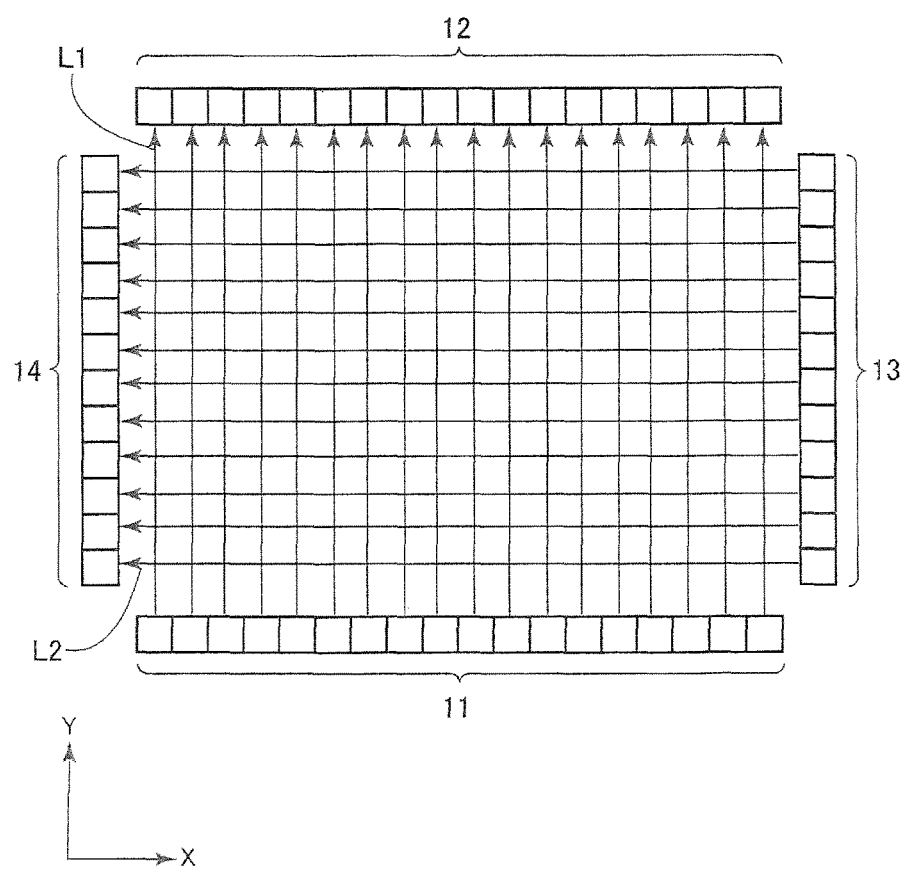
FIG. 24 schematically shows a plain view of the structure of the first modification of touch panel 10 of the first embodiment of this invention.

FIG. 24 schematically shows a plain view of the structure of the first modification of touch panel 10 of the first embodiment of this invention.

Referring to FIG. 24, according to touch panel 10 of the first modification, the position of light emitting elements array and the position of the light reception elements array which face each other in FIG. 4 were interchanged. Light emitting elements array 11 is installed at a front side end (in the bottom part of the FIG. 24) of operation surface CP. Light reception elements array 12 is installed at the back side end (in the top part of the FIG. 24) of operation surface CP. Light emitting elements array 13 is installed at the right end of operation surface CP. Light reception elements array 14 is installed at the left end of operation surface CP.

In the above first and second embodiments, a pair of a light emitting element and a light reception element is installed to form a linear scanning light path. A light emitting element and a light reception element may not face each other. The light emitting element and the light reception element can be installed at the arbitrary location on operation surface CP by using mirrors, for example. As a mirror, a total reflecting mirror or a light transmissive mirror can be adopted.

Figure 25:
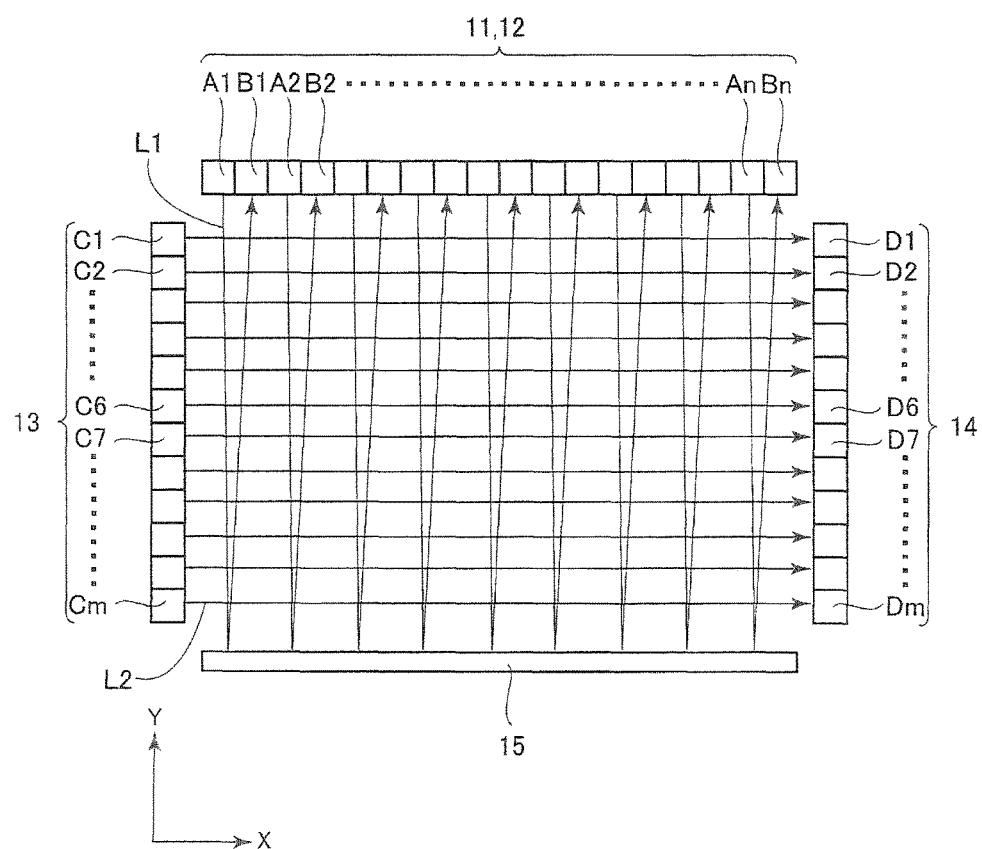
FIG. 25 schematically shows a plain view of the structure of the second modification of touch panel 10 of the first embodiment of this invention.

FIG. 25 schematically shows a plain view of the structure of the second modification of touch panel 10 of the first embodiment of this invention.

Referring to FIG. 25, according to touch panel 10 of the second modification, both of light emitting elements array 11 and light reception elements array 12 are installed at the back side end of operation surface CP. Light emitting elements A1 to An form light emitting elements array 11. Light reception elements B1 to Bn form light reception elements array 12. Each of light emitting elements A1 to An and each of light reception elements B1 to Bn are placed alternately in the X-axis direction. Operation panel device 1 includes a mirror (total reflecting mirror) 15 installed at a front side end of operation surface CP. Light emitted from each of light emitting elements A1 to An of light emitting elements array 11 is reflected by mirror 15. The reflected light is received by each of light reception elements B1 to Bn of light reception elements array 12. Since the light emitting elements and the light reception elements are installed at one side and a mirror is installed at the other side, the structure is simple.

In the first and second embodiments above mentioned, a touch panel inputting device may have a plurality of light reception elements corresponding to one light emitting element.

Figure 26:
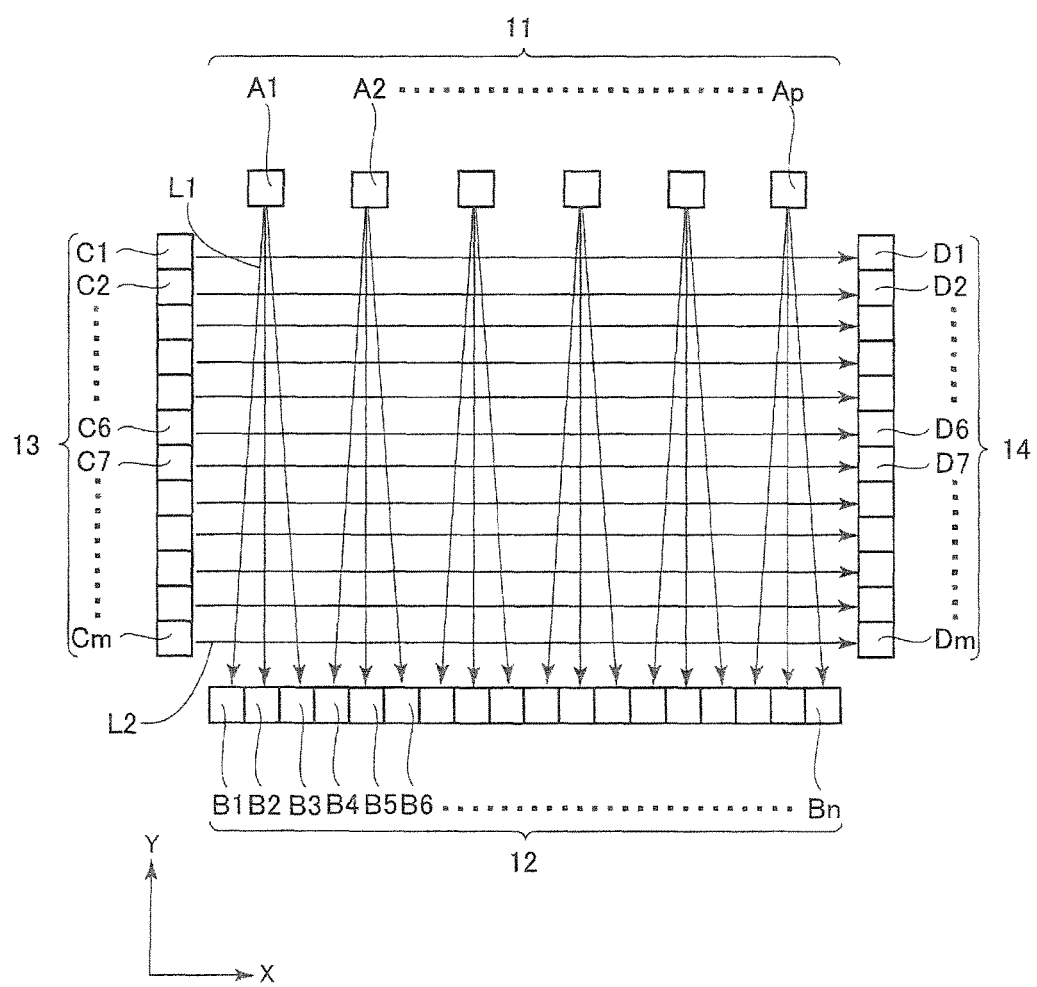
FIG. 26 schematically shows a plain view of the structure of the third modification of touch panel 10 of the first embodiment of this invention.
Figure 27:
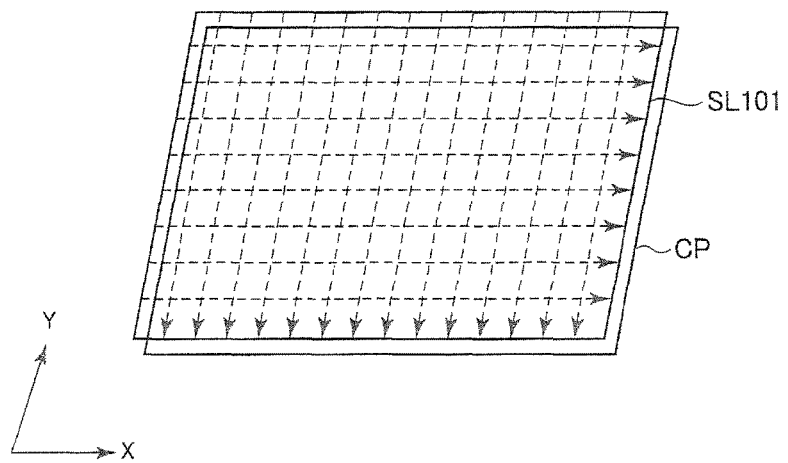
FIG. 27 schematically shows a structure of a conventional optical touch panel inputting device.
Figure 28:
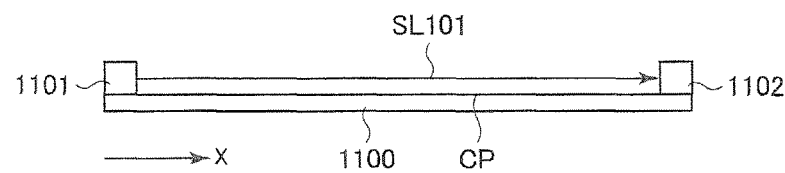
FIG. 28 schematically shows a scanning light path plane of the conventional optical touch panel inputting device.
Figure 29:
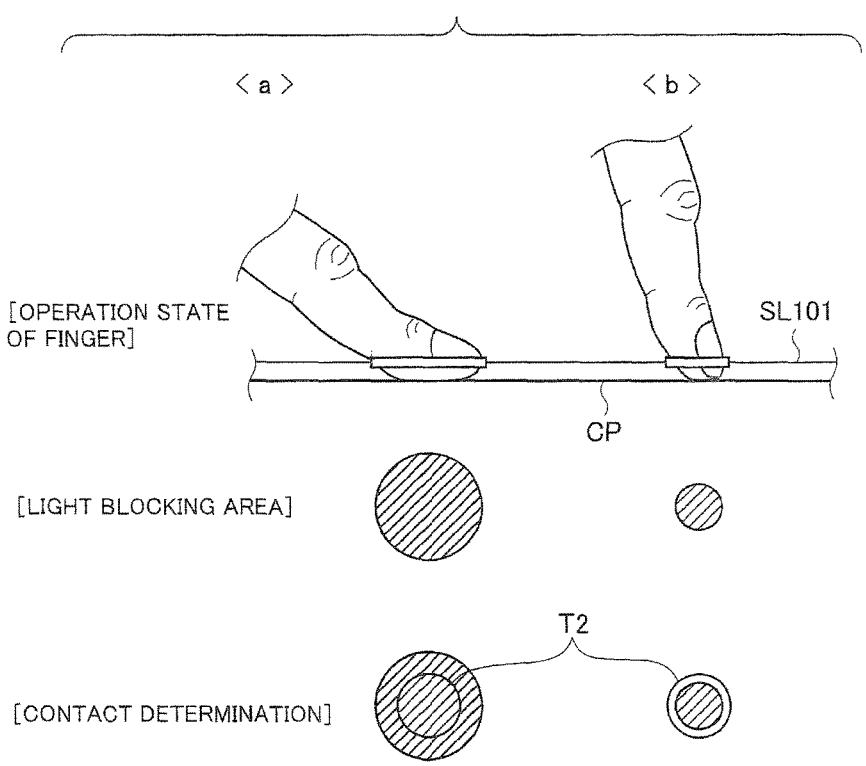
FIG. 29 shows the relationship among an operation state of a finger, a contact area of the finger and contact determination, in accordance with a conventional optical touch panel inputting device.
Figure 30:
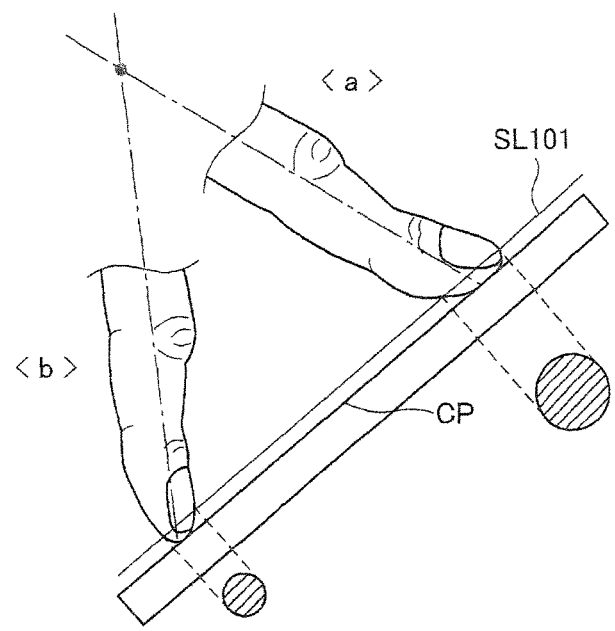
FIG. 30 schematically shows the relationship between a point of the operation and the contact area, in case that operation surface CP is fixed at constant height and a constant angle.

FIG. 26 schematically shows a plain view of the structure of the third modification of touch panel 10 of the first embodiment of this invention.

Referring to FIG. 26, according to touch panel 10 of the third modification, light emitting elements array 11 is configured with light emitting elements A1 to Ap (p is the natural number less than n). Light reception elements array 12 is configured with light reception elements B1 to Bn.

According to touch panel 10 of this modification, one light emitting element corresponds to three light reception elements. When scanning on scanning light path plane SL1, scan circuit 31 enables the light emitting elements one after another in order. During one light emitting element is enabled, light reception elements corresponding to the enabled light emitting element are enabled one after another in order. More specifically, scan circuit 31 enables light emitting element A1 and enables light reception elements B1 to B3, corresponding to light emitting element A1, one after another in order. Scan circuit 31 acquires the amount of light received by each of light reception elements B1 to B3. Next, scan circuit 31 enables light emitting element A2 and enables light reception elements B4 to B6, corresponding to light emitting element A2, one after another in order. Scan circuit 31 acquires the amount of light received by each of light reception elements B4 to B6. Scan circuit 31 performs the same control for light emitting elements A3 to Ap and light reception elements B7 to Bn. According to this modification, the number of light emitting elements installed on touch panel 10 can be reduced.

The processes described in the above embodiments can be executed by software or a hardware circuit. A computer program which executes the processes in the above embodiments can be provided. The program may be provided recorded in recording media of CD-ROMs, flexible disks, hard disks, ROMs, RAMs, memory cards, or the like to users. The program is executed by a computer of a CPU or the like. The program may be downloaded to a device via communication lines like the internet.

Although the preset invention has been described and illustrated in detail, it is clearly understood that the same is by way of illustration and example only and is not to be taken by way of limitation, the spirit and scope of the present invention being limited only by the terms of the appended claims.

What is claimed is:

1. A touch panel inputting device which is installed on a flat operation surface for receiving an operation performed by an operation body, and detects a contact location of the operation body on the operation surface, based on light blocking of a flat scanning light path plane, the touch panel inputting device comprising:
    a first scanning light paths forming device for forming first scanning light paths which are linear;
    a second scanning light paths forming device for forming second scanning light paths which are linear and intersect with the first scanning light paths;
    a third scanning light paths forming device for forming third scanning light paths which are linear; and
    a fourth scanning light paths forming device for forming fourth scanning light paths which are linear and intersect with the third scanning light paths; wherein
    the first and the second scanning light paths form a lower scanning light path plane, wherein the distance between the lower scanning light path plane and the operation surface is relatively short; and
    the third and the fourth scanning light paths form an upper scanning light path plane, wherein the distance between the upper scanning light path plane and the operation surface is relatively long;
    the touch panel inputting device further comprising a switching device for switching the scanning light path plane for detecting the contact of the operation body, between the upper scanning light path plane and the lower scanning light path plane, and
    a detecting device configured to detect the contact of the operation body on the operation surface by the lower scanning light path plane,
    wherein when user's contact of the operation body on the operation surface is detected by the detecting device, the switching device switches the scanning light path plane from the lower scanning light path plane to the upper scanning light path plane, and when the contact of the operation body on the operation surface is not detected by the detecting device, the switching device does not switch the scanning light path plane; and
    wherein when the switching device switches the scanning light path plane from the lower scanning light path plane to the upper scanning light path plane, the lower scanning light path plane for detecting the contact of the operation body is disabled and the upper scanning light path plane for detecting the contact of the operation body is enabled.

2. The touch panel inputting device according to claim 1, wherein
    the upper scanning light path plane slopes at a prescribed angle, with respect to the operation surface from the one end to the other end of the operation surface.

3. The touch panel inputting device according to claim 1, wherein
    the upper scanning light path plane slopes with respect to the operation surface, so that a finger of a user blocks light at a relatively distant point from the operation surface when the user touches the front side of the operation surface, than when the user touches the back side of the operation surface.

4. The touch panel inputting device according to claim 3, wherein
    the distance between a light emitting elements array or a light reception elements array installed at a front side end of the operation surface and the operation surface is more than the distance between another light emitting elements array or another light reception elements array installed at a back side end of the operation surface and the operation surface, the light emitting elements arrays or the light reception elements arrays form the upper scanning light path plane.

5. The touch panel inputting device according to claim 1, wherein
    the first scanning light paths forming device includes the first light emitting elements array and the first light reception elements array which faces the first light emitting elements array, the first light emitting elements array is formed by a plurality of light emitting elements arranged in a linear fashion, the first light reception elements array is formed by a plurality of light reception elements arranged in a linear fashion;
    the second scanning light paths forming device includes the second light emitting elements array and the second light reception elements array which faces the second light emitting elements array, the second light emitting elements array is formed by a plurality of light emitting elements arranged in a linear fashion, the second light reception elements array is formed by a plurality of light reception elements arranged in a linear fashion;
    the third scanning light paths forming device includes the third light emitting elements array placed on the first light emitting elements array, and the third light reception elements array which faces the third light emitting elements array and placed on the first light reception elements array, the third light emitting elements array is formed by a plurality of light emitting elements arranged in a linear fashion, the third light reception elements array is formed by a plurality of light reception elements arranged in a linear fashion; and the fourth scanning light paths forming device includes the fourth light emitting elements array placed on the second light emitting elements array, and the fourth light reception elements array which faces the fourth light emitting elements array and placed on the second light reception elements array, the fourth light emitting elements array is formed by a plurality of light emitting elements arranged in a linear fashion, the fourth light reception elements array is formed by a plurality of light reception elements arranged in a linear fashion.

6. The touch panel inputting device according to claim 1, further comprising a first contact detecting device for detecting the contact on the operation surface, based on the light blocking area of the lower scanning light path plane, when the light blocking is detected on the lower scanning light path plane;
a location identifying device for identifying a location where the operation body contacts, when the first contact detecting device detects the contact; and
a movement detector for detecting a movement of the location identified by the location identifying device; wherein
the switching device switches the scanning light path plane for detecting the contact on the operation surface to the upper scanning light path plane, when the movement detector detects the movement; the touch panel inputting device further comprising
non-contact detecting device for detecting separating of the operation body from the operation surface, based on the light blocking area of the upper scanning light path plane.

7. The touch panel inputting device according to claim 1, further comprising
a key identifier for identifying a size of a key displayed at the light blocking point, when the light blocking is detected on the lower scanning light path plane; wherein
the switching device switches the scanning light path plane for detecting the contact on the operation surface to the upper scanning light path plane, when the size of the key is less than a second threshold value; the touch panel inputting device further comprising
a second contact detecting device for detecting the presence of the contact with the operation surface, based on the light blocking area of the upper scanning light path plane, after the switching of the switching device.

8. The touch panel inputting device according to claim 1, further comprising
a number acquiring device for acquiring the number of the light blocking points, when the light blocking is detected on the lower scanning light path plane; wherein
the switching device switches the scanning light path plane for detecting the contact on the operation surface to the upper scanning light path plane, when the number of the light blocking points acquired by the number acquiring device is plural; the touch panel inputting device further comprising
the third contact detecting device for detecting the presence of the contact with the operation surface, based on the light blocking area of the upper scanning light path plane, after the switching of the switching device.

9. An image processing device configured with the touch panel inputting device according to claim 1, wherein
the touch panel inputting device is placed at a front upper side of the main body of the image processing device.

10. The touch panel inputting device according to claim 1, wherein
the switching device switches the scanning light path plane in accordance with a state of the flat operation surface.

11. The touch panel inputting device according to claim 1, wherein the user's specific operation method comprises a flick operation or a plurality of contacting points by the operation body on the operation surface.

12. A touch panel inputting device which is installed on a flat operation surface for receiving an operation performed by an operation body, and detects a contact location of the operation body on the operation surface, based on light blocking of a flat scanning light path plane, the touch panel inputting device comprising:
a first scanning light paths forming device for forming first scanning light paths which are linear;
a second scanning light paths forming device for forming second scanning light paths which are linear and intersect with the first scanning light paths;
a third scanning light paths forming device for forming third scanning light paths which are linear; and
a fourth scanning light paths forming device for forming fourth scanning light paths which are linear and intersect with the third scanning light paths; wherein
the first and the second scanning light paths form a lower scanning light path plane, wherein the distance between the lower scanning light path plane and the operation surface is relatively short; and
the third and the fourth scanning light paths form an upper scanning light path plane, wherein the distance between the upper scanning light path plane and the operation surface is relatively long;
the touch panel inputting device further comprising a switching device for switching the scanning light path plane for detecting the contact of the operation body, between the upper scanning light path plane and the lower scanning light path plane, and
an angle detector for detecting an inclination angle of the operation surface with respect to the horizontal plane; wherein
the switching device switches the scanning light path plane for detecting the contact on the operation surface to the upper scanning light path plane, when the inclination angle detected by the angle detector is more than or equal to a first threshold value; and
the switching device switches the scanning light path plane for detecting the contact on the operation surface to the lower scanning light path plane, when the inclination angle detected by the angle detector is less than the first threshold value.

13. The touch panel inputting device according to claim 12, wherein the switching device switches the scanning light path plane for detecting the contact on the operation surface to the upper scanning light path plane, only when the inclination angle detected by the angle detector is more than or equal to the first threshold value; and the switching device switches the scanning light path plane for detecting the contact on the operation surface to the lower scanning light path plane, only when the inclination angle detected by the angle detector is less than the first threshold value.

* * * * *